(12) United States Patent
Zvara

(10) Patent No.: US 11,718,400 B2
(45) Date of Patent: Aug. 8, 2023

(54) DISTRIBUTION ASSEMBLY FOR AN AERIAL VEHICLE

(71) Applicant: PRECISION DRONE SERVICES INTELLECTUAL PROPERTY, LLC, Medina, OH (US)

(72) Inventor: Stephen Zvara, Cleveland, OH (US)

( * ) Notice: Subject to any disclaimer, the term of this patent is extended or adjusted under 35 U.S.C. 154(b) by 157 days.

(21) Appl. No.: 17/079,890

(22) Filed: Oct. 26, 2020

(65) Prior Publication Data

US 2021/0053681 A1 Feb. 25, 2021

Related U.S. Application Data

(63) Continuation of application No. 16/120,500, filed on Sep. 4, 2018, now Pat. No. 10,814,980.

(Continued)

(51) Int. Cl.

| | |
|---|---|
| *B64C 39/02* | (2023.01) |
| *B64D 1/16* | (2006.01) |
| *A01G 9/029* | (2018.01) |
| *B64D 1/08* | (2006.01) |
| *A01C 7/04* | (2006.01) |

(Continued)

(52) U.S. Cl.
CPC ............ *B64C 39/024* (2013.01); *A01C 7/042* (2013.01); *A01C 7/205* (2013.01); *A01C 7/206* (2013.01); *A01C 14/00* (2013.01); *A01C 21/005* (2013.01); *A01G 9/0291* (2018.02); *A01G 9/0293* (2018.02); *B64D 1/08* (2013.01); *B64D 1/16* (2013.01); A01C 1/06 (2013.01); A01C 7/04 (2013.01); A01G 9/006 (2013.01); B64U 2101/60 (2023.01)

(58) Field of Classification Search
CPC ............ B64C 39/024; B64C 2201/128; A01G 9/0293; A01G 9/0291; A01G 9/006; A01C 7/042; A01C 7/205; A01C 7/206; A01C 14/00; A01C 1/06; A01C 7/04; A01C 21/005; B64D 1/08; B64D 1/16
See application file for complete search history.

(56) References Cited

U.S. PATENT DOCUMENTS

| | | |
|---|---|---|
| 3,755,962 A | 9/1973 | Walters et al. |
| 3,888,708 A | 6/1975 | Wise et al. |
| (Continued) | | |

FOREIGN PATENT DOCUMENTS

| | | |
|---|---|---|
| CN | 1029949 C | 10/1995 |
| CN | 101548601 B | 6/2011 |
| (Continued) | | |

*Primary Examiner* — Gertrude Arthur Jeanglaude
(74) *Attorney, Agent, or Firm* — McDonald Hopkins LLC

(57) ABSTRACT

Provided is a seeder assembly for an aerial vehicle as shown and described. The distribution assembly includes a frame selectively attachable to an aerial vehicle and at least one distribution device attached to the frame. The distribution device having a body defining a cavity to receive a plurality of products and a barrel to discharge the plurality of products. A control device configured to communicate with the aerial vehicle and the distribution device to coordinate the timing that products are discharged and a spacing of a subsequent discharged product relative to the speed of the aerial vehicle. A system, method, and cartridge device associated with the distribution assembly are also contemplated by this disclosure.

20 Claims, 16 Drawing Sheets

Related U.S. Application Data

Figure 1:
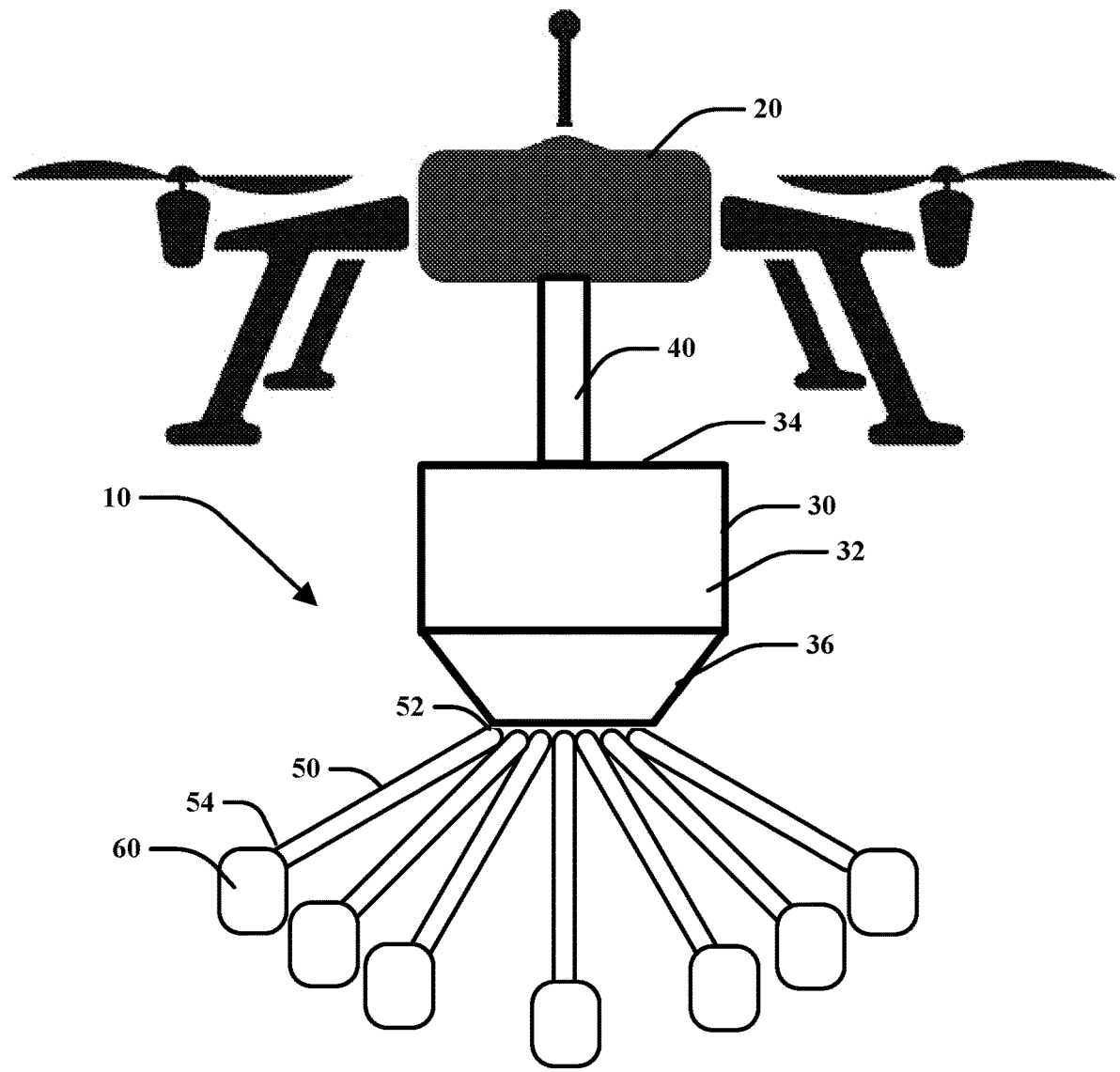

(60) Provisional application No. 62/553,839, filed on Sep. 2, 2017.

(51) Int. Cl.
| | |
|---|---|
| *A01C 7/20* | (2006.01) |
| *A01C 14/00* | (2006.01) |
| *A01C 21/00* | (2006.01) |
| A01G 9/00 | (2018.01) |
| A01C 1/06 | (2006.01) |
| B64U 101/60 | (2023.01) |

(56) References Cited

U.S. PATENT DOCUMENTS

| | | |
|---|---|---|
| 3,944,137 A | 3/1976 | Cutchins et al. |
| 4,023,562 A | 5/1977 | Hynecek et al. |
| 4,176,721 A * | 12/1979 | Poggemiller .......... A01D 33/14 111/926 |
| 4,333,265 A * | 6/1982 | Arnold ..................... B64D 1/10 221/92 |
| 4,347,951 A | 9/1982 | Wood |
| 4,407,296 A | 10/1983 | Anderson |
| 4,485,813 A | 12/1984 | Anderson et al. |
| 4,650,093 A * | 3/1987 | Meyer-Bosse ......... A01C 7/044 221/233 |
| 4,815,472 A | 3/1989 | Wise et al. |
| 4,881,410 A | 11/1989 | Wise et al. |
| 4,953,387 A | 9/1990 | Johnson et al. |
| 5,013,396 A | 5/1991 | Wise et al. |
| 5,046,497 A | 9/1991 | Millar |
| 5,055,838 A | 10/1991 | Wise et al. |
| 5,059,543 A | 10/1991 | Wise et al. |
| 5,108,420 A | 4/1992 | Marks |
| 5,113,868 A | 5/1992 | Wise et al. |
| 5,257,630 A | 11/1993 | Broitman et al. |
| 5,262,127 A | 11/1993 | Wise et al. |
| 5,282,827 A | 2/1994 | Kensey et al. |
| 5,296,255 A | 3/1994 | Gland et al. |
| 5,343,064 A | 8/1994 | Spangler et al. |
| 5,368,040 A | 11/1994 | Carney |
| 5,377,524 A | 1/1995 | Wise et al. |
| 5,417,235 A | 5/1995 | Wise et al. |
| 5,564,434 A | 10/1996 | Halperin et al. |
| 5,690,674 A | 11/1997 | Diaz |
| 5,728,132 A | 3/1998 | Van Tassel et al. |
| 5,992,769 A | 11/1999 | Wise et al. |
| 6,109,113 A | 8/2000 | Chavan et al. |
| 6,126,675 A | 10/2000 | Shchervinsky et al. |
| 6,140,144 A | 10/2000 | Najafi et al. |
| 6,171,253 B1 | 1/2001 | Bullister et al. |
| 6,174,322 B1 | 1/2001 | Schneidt |
| 6,190,400 B1 | 2/2001 | Van De Moer et al. |
| 6,206,835 B1 | 3/2001 | Spillman, Jr. et al. |
| 6,232,150 B1 | 5/2001 | Lin et al. |
| 6,309,350 B1 | 10/2001 | Van Tassel et al. |
| 6,331,163 B1 | 12/2001 | Kaplan |
| 6,338,284 B1 | 1/2002 | Najafi et al. |
| 6,366,804 B1 | 4/2002 | Mejia |
| 6,438,408 B1 | 8/2002 | Mulligan et al. |
| 6,454,720 B1 | 9/2002 | Clerc et al. |
| 6,457,761 B1 | 10/2002 | Benoit |
| 6,471,656 B1 | 10/2002 | Shalman et al. |
| 6,477,901 B1 | 11/2002 | Tadigadapa et al. |
| 6,499,354 B1 | 12/2002 | Najafi et al. |
| 6,592,608 B2 | 7/2003 | Fisher et al. |
| 6,636,769 B2 | 10/2003 | Govari et al. |
| 6,645,143 B2 | 11/2003 | Vantassel et al. |
| 6,647,778 B2 | 11/2003 | Sparks |
| 6,666,826 B2 | 12/2003 | Salo et al. |
| 6,667,725 B1 | 12/2003 | Simons et al. |
| 6,682,490 B2 | 1/2004 | Roy et al. |
| 6,701,857 B1 * | 3/2004 | Jensen .................... A01C 7/006 111/900 |
| 6,713,828 B1 | 3/2004 | Chavan et al. |
| 6,749,622 B2 | 6/2004 | McGuckin, Jr. et al. |
| 6,764,446 B2 | 7/2004 | Wolinsky et al. |
| 6,769,493 B1 | 8/2004 | Fima et al. |
| 6,779,406 B1 | 8/2004 | Kuznia et al. |
| 6,783,499 B2 | 8/2004 | Schwartz |
| 6,824,521 B2 | 11/2004 | Rich et al. |
| 6,827,029 B1 * | 12/2004 | Wendte .................. A01C 7/042 111/185 |
| 6,838,640 B2 | 1/2005 | Wise et al. |
| 6,844,213 B2 | 1/2005 | Sparks |
| 6,855,115 B2 | 2/2005 | Fonsenca et al. |
| 6,890,300 B2 | 5/2005 | Lloyd et al. |
| 6,893,885 B2 | 5/2005 | Lemmerhirt et al. |
| 6,916,310 B2 | 7/2005 | Sommerich |
| 6,923,625 B2 | 8/2005 | Sparks |
| 6,926,670 B2 | 8/2005 | Rich et al. |
| 6,932,114 B2 | 8/2005 | Sparks |
| 6,935,010 B2 | 8/2005 | Tadigadapa et al. |
| 6,939,299 B1 | 9/2005 | Peterson et al. |
| 6,959,608 B2 | 11/2005 | Bly et al. |
| 6,968,743 B2 | 11/2005 | Rich et al. |
| 6,970,742 B2 | 11/2005 | Mann et al. |
| 6,981,958 B1 | 1/2006 | Gharib et al. |
| 7,001,398 B2 | 2/2006 | Carley et al. |
| 7,004,015 B2 | 2/2006 | Chang-Chien et al. |
| 7,007,551 B2 | 3/2006 | Zdeblick et al. |
| 7,013,734 B2 | 3/2006 | Zdeblick et al. |
| 7,028,550 B2 | 4/2006 | Zdeblick et al. |
| 7,059,176 B2 | 6/2006 | Sparks |
| 7,066,031 B2 | 6/2006 | Zdeblick et al. |
| 7,073,387 B2 | 7/2006 | Zdeblick et al. |
| 7,081,125 B2 | 7/2006 | Edwards et al. |
| 7,137,953 B2 | 11/2006 | Eigler et al. |
| 7,147,604 B1 | 12/2006 | Allen et al. |
| 7,149,587 B2 | 12/2006 | Wardle et al. |
| 7,162,926 B1 | 1/2007 | Guziak et al. |
| 7,181,261 B2 | 2/2007 | Silver |
| 7,192,001 B2 | 3/2007 | Wise et al. |
| 7,198,603 B2 | 4/2007 | Penner et al. |
| 7,211,048 B1 | 5/2007 | Najafi et al. |
| 7,228,735 B2 | 6/2007 | Sparks et al. |
| 7,236,821 B2 | 6/2007 | Cates et al. |
| 7,335,161 B2 | 2/2008 | Von Arx et al. |
| 7,452,334 B2 | 11/2008 | Gianchandani et al. |
| 7,481,771 B2 | 1/2009 | Fonseca et al. |
| 7,509,169 B2 | 3/2009 | Eigler et al. |
| 7,566,308 B2 | 7/2009 | Stahmann |
| 7,572,228 B2 | 8/2009 | Wolinsky et al. |
| 7,678,132 B2 | 3/2010 | Abbott et al. |
| 7,678,135 B2 | 3/2010 | Maahs et al. |
| 7,699,059 B2 | 4/2010 | Fonseca et al. |
| 7,931,671 B2 | 4/2011 | Tenerz |
| 8,087,315 B2 | 1/2012 | Goosen et al. |
| 8,162,263 B2 | 4/2012 | Wong et al. |
| 8,251,307 B2 | 8/2012 | Goosen |
| 8,267,954 B2 | 9/2012 | Decant, Jr. et al. |
| 8,303,511 B2 | 11/2012 | Eigler et al. |
| 8,308,794 B2 | 11/2012 | Martinson et al. |
| 8,323,192 B2 | 12/2012 | Kilcoyne et al. |
| 8,512,252 B2 | 8/2013 | Ludomirsky et al. |
| 8,752,796 B2 | 6/2014 | Occhiato et al. |
| 9,280,038 B1 | 3/2016 | Pan et al. |
| 9,346,547 B2 | 5/2016 | Patrick et al. |
| 9,382,003 B2 | 7/2016 | Burema et al. |
| 9,487,292 B2 | 11/2016 | Phud'Homme-Lacroix |
| 9,493,232 B2 | 11/2016 | Wang et al. |
| 9,567,081 B1 | 2/2017 | Beckman et al. |
| 9,573,684 B2 | 2/2017 | Kimchi et al. |
| 9,688,404 B1 | 6/2017 | Buchmueller et al. |
| 9,714,012 B1 | 7/2017 | Hoareau et al. |
| 10,337,645 B2 * | 7/2019 | Roberge ................ F16K 31/602 |
| 2002/0188207 A1 | 12/2002 | Richter |
| 2003/0097073 A1 | 5/2003 | Bullister et al. |
| 2003/0139771 A1 | 7/2003 | Fisher et al. |
| 2003/0191496 A1 | 10/2003 | Edwards et al. |
| 2004/0102806 A1 | 5/2004 | Broome et al. |
| 2004/0158138 A1 | 8/2004 | Kilcoyne et al. |
| 2004/0255643 A1 | 12/2004 | Wise et al. |
| 2005/0013685 A1 | 1/2005 | Ricketts et al. |

(56) References Cited

U.S. PATENT DOCUMENTS

| | | | |
|---|---|---|---|
| 2005/0043601 A1 | 2/2005 | Kilcoyne et al. | |
| 2005/0049634 A1 | 3/2005 | Chopra | |
| 2005/0187482 A1 | 8/2005 | O'Brien et al. | |
| 2006/0052821 A1 | 3/2006 | Abbott et al. | |
| 2006/0064133 A1 | 3/2006 | Von Arx et al. | |
| 2006/0064134 A1 | 3/2006 | Mazar et al. | |
| 2006/0064142 A1 | 3/2006 | Chavan et al. | |
| 2006/0116590 A1 | 6/2006 | Fayram et al. | |
| 2006/0122522 A1 | 6/2006 | Chavan et al. | |
| 2006/0178583 A1 | 8/2006 | Montegrande et al. | |
| 2006/0212047 A1 | 9/2006 | Abbott et al. | |
| 2007/0016084 A1 | 1/2007 | Denault | |
| 2011/0084162 A1* | 4/2011 | Goossen | B64D 1/22 244/135 C |
| 2012/0153087 A1 | 6/2012 | Collette et al. | |
| 2016/0023761 A1 | 1/2016 | McNally | |
| 2016/0198088 A1 | 7/2016 | Wang et al. | |
| 2016/0207627 A1 | 7/2016 | Horeau et al. | |
| 2017/0081043 A1 | 3/2017 | Jones et al. | |
| 2017/0144759 A1 | 5/2017 | Chiu | |
| 2017/0203857 A1 | 7/2017 | O'Toole | |
| 2017/0253335 A1 | 9/2017 | Thompson et al. | |
| 2017/0267348 A1 | 9/2017 | Sweeney et al. | |

FOREIGN PATENT DOCUMENTS

| | | | |
|---|---|---|---|
| CN | 204110368 | | 1/2015 |
| CN | 102870530 | B | 8/2015 |
| CN | 204527648 | | 8/2015 |
| CN | 204713430 | | 10/2015 |
| CN | 105035336 | | 11/2015 |
| CN | 204776056 | | 11/2015 |
| CN | 204871622 | | 12/2015 |
| CN | 204871626 | | 12/2015 |
| CN | 204895855 | | 12/2015 |
| CN | 205044966 | U | 2/2016 |
| CN | 104255137 | B | 3/2016 |
| CN | 105359680 | A | 3/2016 |
| CN | 105366054 | A | 3/2016 |
| CN | 105432190 | A | 3/2016 |
| CN | 105438469 | A | 3/2016 |
| CN | 105438470 | A | 3/2016 |
| CN | 105438471 | A | 3/2016 |
| CN | 105438491 | | 3/2016 |
| CN | 205249773 | U | 5/2016 |
| CN | 105697957 | | 6/2016 |
| CN | 205311910 | U | 6/2016 |
| CN | 205311911 | U | 6/2016 |
| CN | 205327418 | U | 6/2016 |
| CN | 104176254 | B | 8/2016 |
| CN | 205418091 | U | 8/2016 |
| CN | 205454521 | U | 8/2016 |
| CN | 106081113 | | 11/2016 |
| CN | 106114879 | | 11/2016 |
| CN | 105173084 | B | 12/2016 |
| CN | 205872497 | | 1/2017 |
| CN | 205891249 | | 1/2017 |
| CN | 106416530 | A | 2/2017 |
| CN | 106428598 | | 2/2017 |
| CN | 205931259 | | 2/2017 |
| CN | 205971822 | | 2/2017 |
| CN | 104670497 | B | 3/2017 |
| CN | 206012972 | | 3/2017 |
| CN | 106585990 | | 4/2017 |
| CN | 206107589 | | 4/2017 |
| CN | 106628217 | | 5/2017 |
| CN | 106672240 | | 5/2017 |
| CN | 106794902 | | 5/2017 |
| CN | 206196773 | | 5/2017 |
| CN | 206202674 | U | 5/2017 |
| CN | 106864752 | | 6/2017 |
| CN | 106892117 | | 6/2017 |
| CN | 206237781 | U | 6/2017 |
| CN | 106982575 | A | 7/2017 |
| CN | 106986031 | | 7/2017 |
| CN | 206299660 | | 7/2017 |
| CN | 107108042 | | 8/2017 |
| CN | 206367599 | U | 8/2017 |
| CN | 206389740 | U | 8/2017 |
| CN | 206476116 | | 9/2017 |
| CN | 206502026 | U | 9/2017 |
| EP | 3197258 | A1 | 8/2017 |
| FR | 3040688 | | 3/2017 |
| GB | 2419076 | A | 4/2006 |
| IN | 201741025926 | | 7/2017 |
| KR | 101694636 | B1 | 9/2015 |
| KR | 101775379 | B1 | 9/2017 |
| KR | 101780454 | | 9/2017 |
| WO | 2014147043 | A1 | 9/2014 |
| WO | 2015177760 | | 11/2015 |
| WO | 201700299 | | 1/2017 |
| WO | 201708533 | | 1/2017 |
| WO | 201796392 | | 6/2017 |
| WO | 2017131587 | A1 | 8/2017 |

* cited by examiner

DISTRIBUTION ASSEMBLY FOR AN AERIAL VEHICLE

CROSS-REFERENCE TO RELATED APPLICATIONS

This application is a continuation of U.S. Utility application Ser. No. 16/120,500 entitled "DISTRIBUTION ASSEMBLY FOR AN AERIAL VEHICLE" filed on Sep. 4, 2018, which claims priority to U.S. Provisional Patent App. No. 62/553,839 entitled "SEEDER ASSEMBLY FOR AN AERIAL VEHICLE" filed on Sep. 2, 2017 which is hereby incorporated by reference in its entirety.

FIELD OF INVENTION

The present invention generally relates to a distribution assembly for an aerial vehicle, and more particularly to a distribution assembly configured to discharge product from the distribution assembly attached to the aerial vehicle.

BACKGROUND

Aerial vehicles have been used to distribute products therefrom such as various chemicals and seeds to large areas of land in an attempt to efficiently farm the land. Aerial vehicles such as airplanes, helicopters, hovercrafts, and unmanned aerial vehicles (UAVs) have been utilized for delivering products, surveillance, and other related services. Aerial vehicles are convenient for rapid delivery and providing aerial surveillance of a location. In one example, UAVs are used in a system for farming crop dusting, planting, fertilizing and other field jobs as described in U.S. Pat. No. 9,382,003 which is incorporated by reference in its entirety. The '003 patent discloses the use of a drone with a seeder assembly that includes a drill bit and auger to drill into the ground to plant seeds.

Drawbacks exist with some of the methods identified by this patent and by other seeding assemblies for aerial vehicles for use in farming. In particular, these known agricultural systems have been unable to provide a way to efficiently distribute seeds from remote vehicles such as by aerial vehicles. Thus, there is a need to provide a distribution assembly that may be capable of distributing seeds or other product in a controlled manner. There is also a need to provide a cartridge to house a seed to be able to propel seeds into desired depths from a remote vehicle.

SUMMARY

Provided is a seeder assembly for an aerial vehicle as shown and described. The distribution assembly includes a frame selectively attachable to an aerial vehicle and at least one distribution device attached to the frame. The distribution device having a body defining a cavity to receive a plurality of products and a barrel to discharge the plurality of products. A control device configured to communicate with the aerial vehicle and the distribution device to coordinate the timing that products are discharged and a spacing of a subsequent discharged product relative to the speed of the aerial vehicle. A variable pressure device may be provided for applying pressure to discharge product from the cavity of the body. A vacuum member may be provided for drawing product towards the cavity. A hopper may be provided for containing said plurality of products, the hopper including at least one distribution channel in communication with the cavity of the body to transport products from the hopper to the cavity. Alternatively, a cartridge assembly may be configured to be attached to the distribution device to provide the plurality of products to the cavity. The cartridge assembly may hold a plurality of products each having a cartridge body for receiving or supporting a seed. The control device may be in wireless communication with a remote computer device through a network to receive information related to the operation of the distribution assembly as the aerial vehicle is in flight. The control device may be configured to control the variable pressure device to discharge the product from the cavity. A plurality of distribution devices may be positioned along said frame. The plurality of distribution devices may include a first distribution device and a second distribution device wherein the control device controls the first distribution device to discharge a first product and controls the second distribution device to discharge a second product wherein the control device coordinates the timing and spacing of the discharge of said first product and said second product relative to the speed of the aerial vehicle. The control device may control a third distribution device to discharge a third product wherein the control device coordinates the timing and spacing of the discharge of the third product relative to the discharge of the first and second products and relative to the speed of the aerial vehicle. An application device may be provided that includes at least one spray nozzle to apply an actuation solution to the product as the product is discharged from the distribution device. The distribution device may includes a housing having an upper cavity to receive a seed and a lower cavity to receive a cartridge device wherein the distribution device may be configured to position the seed within the cartridge device while in the housing and to discharge the cartridge device with the seed from the distribution device.

In another embodiment, a system is provided for distributing product in a field. The system includes an aerial vehicle and a distribution assembly including a frame selectively attachable to an aerial vehicle. At least one distribution device may be attached to the frame. The distribution device having a body defining a cavity to receive a plurality of products and a barrel to discharge the plurality of products. A control device may be configured to communicate with the aerial vehicle and the distribution assembly. A logic comprising a flight control module, an area mapping module, and a distribution device control module may be programmed to analyze data and to communicate signals to the control device to operate the distribution assembly and the aerial vehicle wherein operation of the distribution assembly includes discharging said plurality of products from the distribution device in a timed manner to achieve desired spacing of said products relative to the speed of the aerial vehicle. The flight control module may communicate with sensors to analyze sensed data for the control of the flight of the aerial vehicle, wherein the sensed data includes at least one of: stabilization of the aerial vehicle, weather, weight of the aerial vehicle and product payload, and the speed of the aerial vehicle. The area mapping module may communicate with sensors to analyze sensed data to determine a flight path of the aerial vehicle and to determine locations to distribute product in a field, wherein the sensed data includes at least one of: soil type, moisture content, field terrain, and planting pattern. The distribution device control module may communicate with sensors to analyze sensed data to determine a desired time to discharge product from the distribution device, wherein the sensed data includes number of stored product, number of loaded product, timing and spacing related to a first propelled product from a first distribution device related to a second propelled product from a second distribution device, location of a plurality of distribution devices aligned in position on the frame relative to the field, type of product, trajectory of product, accuracy of the propelled product relative to the desired location, the timing of propelling a plurality of distribution devices, and the relative spacing between propelled product and landed product in the field. The control device may continuously monitor the aerial vehicle and the distribution device such that the control device sends signals to adjust operation of at least one of: stabilization, flight pattern accuracy, control of discharging product, product count, and accuracy of discharged product for the aerial vehicle and the distribution assembly.

In another embodiment, provided is a method of distributing product from an aerial vehicle. Here, a frame may be provided that is selectively attachable to an aerial vehicle. A plurality of distribution devices may be attached to the frame. An aerial vehicle may be operated to fly along a flight pattern above a field designated to receive a planted product. A plurality of products may be provided to the plurality of distribution devices. The plurality of products may be selectively discharged from the plurality of distribution devices wherein a control device may be configured to coordinate the timing and spacing of the discharged products relative to the speed of the aerial vehicle. An activator solution may be applied to the products before the product is discharged from the distribution devices.

In another embodiment, provided is a cartridge device comprising a generally hollow cartridge body that includes a cavity for receiving and supporting at least one seed wherein the cartridge body is shaped as and aerodynamic projectile. A tapered end may extend from the cartridge body, said tapered end includes at least one of an open portion or a continuous closed portion. The cartridge body may be configured to be discharged from a barrel of a distribution device and to be lodged within soil to deploy the seed at a predetermined depth. The cavity may be pre-loaded with a chemical material, wherein the chemical material includes at least one of a fungicide, an insecticide, and a fertilizer. Surface mounted protrusions, such as threads, may be provided along an outer perimeter surface to assist with burying into the soil as it is received therein. A tracer material may be located on or within the cartridge device, wherein the tracer material is biodegradable and allows for tracking by an imaging device after being discharged by the distribution device. The cartridge body may be made from a compressible aerodynamic membrane such that once a portion of the cartridge body enters into the soil, that portion of the cartridge body contorts in a designed manner to open and allow the seed to be discharged into a desired depth within the soil. The membrane may be one of a continuous collagen material or polymer, wherein said membrane may be rigid to receive and support a seed and be propelled from the distribution device and wherein said membrane may be configured to contort once received in the soil and wherein said membrane may be configured to begin decomposing after being sprayed by an activator spray based on the level of water that may exist in the soil. The membrane may be made of one of a hydrophobic or a hydrophilic material that is capable to degrade at a controlled and known rate based on the level of water measured in the soil. An adjustment member may be configured to modify the desired depth within the soil that the seed is planted after being discharged by the distribution device. A ground stop member may be positioned along the cartridge body to prevent the cartridge body from entering the soil further than the position of the ground stop member on the cartridge body. A retainer member may protrude from a side of the cartridge body for alignment with a cartridge assembly and within an inner passageway of a distribution device.

BRIEF DESCRIPTION OF THE DRAWINGS

Operation of the invention may be better understood by reference to the detailed description taken in connection with the following illustrations, wherein:

FIG. 1 is a schematic diagram of embodiments of a distribution assembly for an aerial vehicle in accordance with the instant disclosure;

FIG. 2 is a schematic diagram of embodiments of a distribution device in accordance with the instant disclosure;

FIG. 3 is a schematic diagram of embodiments of the distribution device of FIG. 2 in accordance with the instant disclosure;

FIG. 4 is a schematic diagram of embodiments of the distribution device of FIG. 2 in accordance with the instant disclosure;

FIG. 5 is a schematic diagram of embodiments of the distribution device of FIG. 2 in accordance with the instant disclosure;

FIG. 6 is a schematic diagram of an embodiment of a distribution device for a cartridge device in accordance with the instant disclosure;

FIG. 7 is a schematic diagram of embodiments of the distribution device of FIG. 6 in accordance with the instant disclosure;

FIG. 8 is a schematic diagram of embodiments of a cartridge assembly for the distribution device in accordance with the instant disclosure;

FIG. 9 is a schematic diagram of an embodiment of a cartridge device in accordance with the instant disclosure;

FIG. 10 is a schematic diagram of the cartridge body in various stages as it enters soil;

FIG. 11 is a schematic diagram of another embodiment of a distribution device in accordance with the instant disclosure;

FIG. 12A is a schematic diagram of a side view of another embodiment of a distribution device in accordance with the instant disclosure;

FIG. 12B is a schematic diagram of a top view of the distribution device of FIG. 12B in accordance with the instant disclosure;

FIG. 13 is a schematic diagram of a side view of an embodiment of the distribution assembly attached to an aerial vehicle in accordance with the instant disclosure;

FIG. 14 is a schematic diagram of a top view of an embodiment of the distribution assembly attached to an aerial vehicle in accordance with the instant disclosure;

FIG. 15A is a schematic diagram of a side view of an embodiment of the distribution assembly attached to a ground assembly in accordance with the instant disclosure;

FIG. 15B is a schematic diagram of a top view of a portion of the ground assembly of FIG. 15A; and FIG. 16 is a diagram of an organization structure of a logic for the control device in accordance with the instant disclosure.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined, switched, or altered without departing from the scope of the present teachings, e.g., features of each embodiment disclosed herein may be combined, switched, or replaced with features of the other embodiments disclosed herein. As such, the following description is presented by way of illustration only and should not limit in any way the various alternatives and modifications that may be made to the illustrated embodiments and still be within the spirit and scope of the present teachings.

As illustrated by FIG. 1, provided is a distribution assembly 10 attached to an aerial vehicle 20. The aerial vehicle 20 may be any such aircraft such as an unmanned aerial vehicle (UAV), airplane, hovercraft, helicopter and the like. FIG. 1 illustrates an embodiment of the disclosure utilized with a UAV. The distribution assembly 10 may be securely attached to the aerial vehicle 20 during use. It may be detached and attached to the aerial vehicle as needed for use and maintenance.

In one embodiment, the distribution assembly 10 may include a hopper 30 that is operatively connected with an aerial vehicle 20 by a connection member 40. The hopper 30 may be attached to the aerial vehicle 20 in any known manner such that the distribution assembly 10 may be supportably attached while in use and may be detached as needed or when not in use. In one embodiment, the distribution assembly 10 may include an implement hitch mount assembly as disclosed by U.S. Provisional Patent No. 62/552,564, titled AERIAL VEHICLE IMPLEMENT HITCH ASSEMBLY, filed Aug. 31, 2017 which is incorporated by reference in its entirety.

The hopper 30 may define a cavity 32 capable of containing an agricultural product such as feed, seed, fertilizer. The hopper 30 may include an opening 34 to allow for access to the cavity 32. The hopper 30 may include a tapered configuration to allow for product to flow towards a bottom portion 36. The hopper 30 may also be configured to be refilled while in use as a separate aerial vehicle may be able to transport additional product and dispose that additional product through the opening 34 to fill or refill the cavity 32 of the hopper 30.

As illustrated by FIG. 1, a plurality of distribution channels 50 may be attached to the hopper 30 to allow for communication with the cavity 32. The distribution channels 50 may each be a generally hollow tube having a distal end 52 attached to the hopper 30 and an opposite proximal end 54. The distribution channels 50 may be positioned along the bottom portion 36 of the hopper 30 to allow for the distribution of product therefrom. However, the distribution channels 50 may be positioned along various portions of the hopper 30 and this disclosure is not limited in this regard. The distribution channels 50 may allow for product from the cavity 32 of the hopper 30 to be received within the distribution channels 50 and be transported to a distribution device 60 attached to the proximal end 54 of each of the distribution channels 50. The distribution channels 50 may be made of any material that would allow for the transportation of product from the hopper to the distribution devices, for example, plastics and various polymers, metals or alloys. The material is preferable lightweight but may allow for flexibility in its configuration but be structurally stable as it is being aerially transported. The distribution assembly 10 may include any number of distributions channel 50 as it may include between one to seven (7) as illustrated by FIG. 1 or even more. In another embodiment, the distribution channels 50 may include various configurations to distribute product from the hopper to a plurality of distribution devices of the distribution assembly 10 and this disclosure is not limited in this regard.

Figure 2:
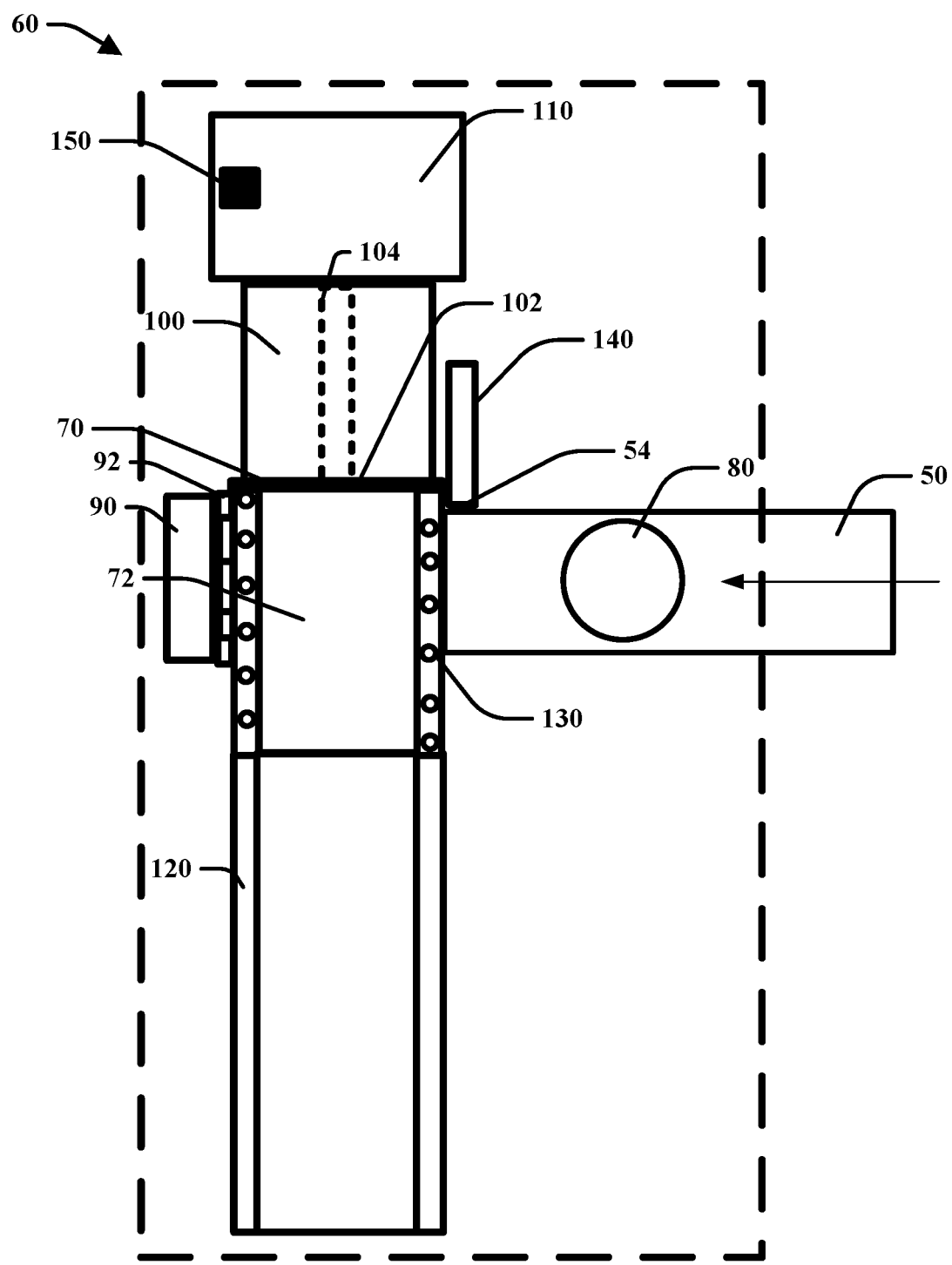

An example of the distribution device 60 is illustrated by FIG. 2. In one embodiment, the distribution device 60 is attached to the distribution channel 50 as illustrated. Here, the distribution device 60 of FIG. 1 is enlarged and identified within the broken lines of FIG. 2. The distribution device 60 may be in communication with the distribution channel 50 and be attached to the proximal end 54 of the distribution channel 50. The distribution device 60 may include a body 70 that defines a cavity 72 for receiving product 80 therein. The product 80 is illustrated as a seed that is upstream of the cavity 72 in FIG. 2. The product 80 may be any type of agricultural related item such as feed, seed, fertilizer, agricultural related chemical, nutrients, fungicide treatment, insecticide treatment, pesticides, bug repellant, vector control, cartridge devices, and the like and this description is not limited to the construction of the term "product" herein. The body 70 may be adapted to retrieve product 80 from the hopper 30 and propel product towards the ground with a variable amount of pressure to control the speed in which the product may be propelled.

In one embodiment, the distribution device 60 includes a vacuum member 90 that applies a suction force to the distribution channel 50 to draw product into the cavity 72 of the body 70. Once within the cavity 72, the product 80 may abut against an abutment surface 92. The abutment surface 92 may include a screen or vent that allows the vacuum member 90 to apply the suction force within the cavity 72 and the distribution channel 50 as the product 80 may be maintained within the cavity 72.

A piston member 100 may be operably engaged with the body 70. The piston member 100 may include a surface 102 that faces within the cavity 72 and may abut against the product 80. An inner passageway 104 may communicate with the cavity 72 and communicate pressure from a variable pressure device 110 to the cavity 72. The variable pressure device 110 may be controlled to apply pneumatic pressure therethrough. The pressure may be varied and controlled based on the operation of the distribution assembly 10 which will be described more fully below.

A barrel 120 may extend from the body 70 and allow the product 80 to be distributed therethough. A control device 150 may be operable to control the distribution device 60 and to modify the amount of pressure applied to the cavity 72 by the variable pressure device 110 to propel product 80 through the barrel 120. A biasing member 130 may be attached to the body 70 and the piston member 100 to apply a bias force against the piston member 100 to position it in an open position as illustrated by FIG. 2. A check member 140 may also be provided to maintain the distribution channel 50 open to meter product 80 received within the cavity 72 as illustrated by FIG. 2. The check member 140 may close once the product 80 is received within the cavity 72 as illustrated by FIG. 3.

In operation, the vacuum member 90 may introduce pressure to the distribution channel 50 to cause product 80 to be received within the cavity 72. In one embodiment, the vacuum member 90 may provide a constant amount of pressure to draw the product 80.

Figure 3:
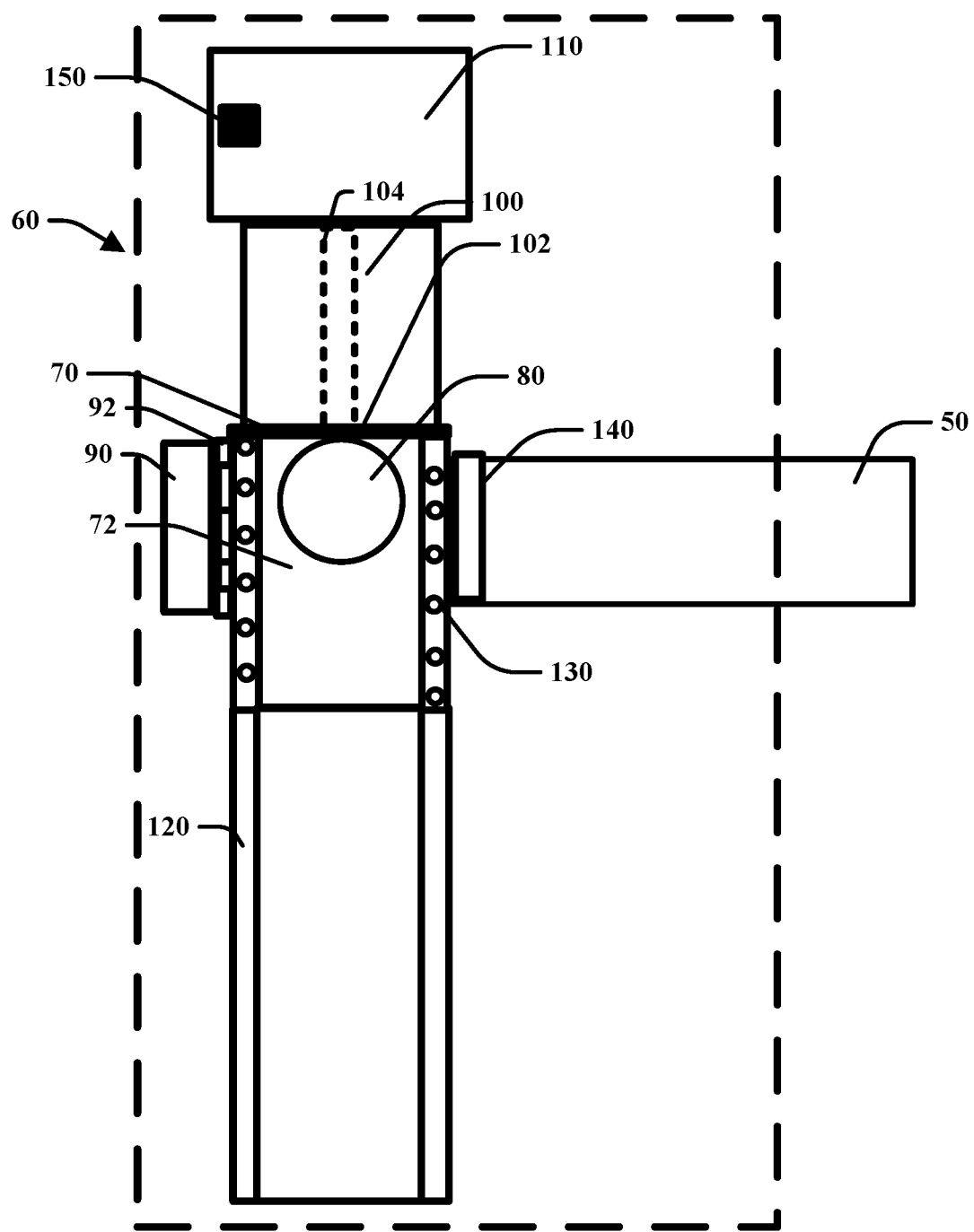
Figure 4:
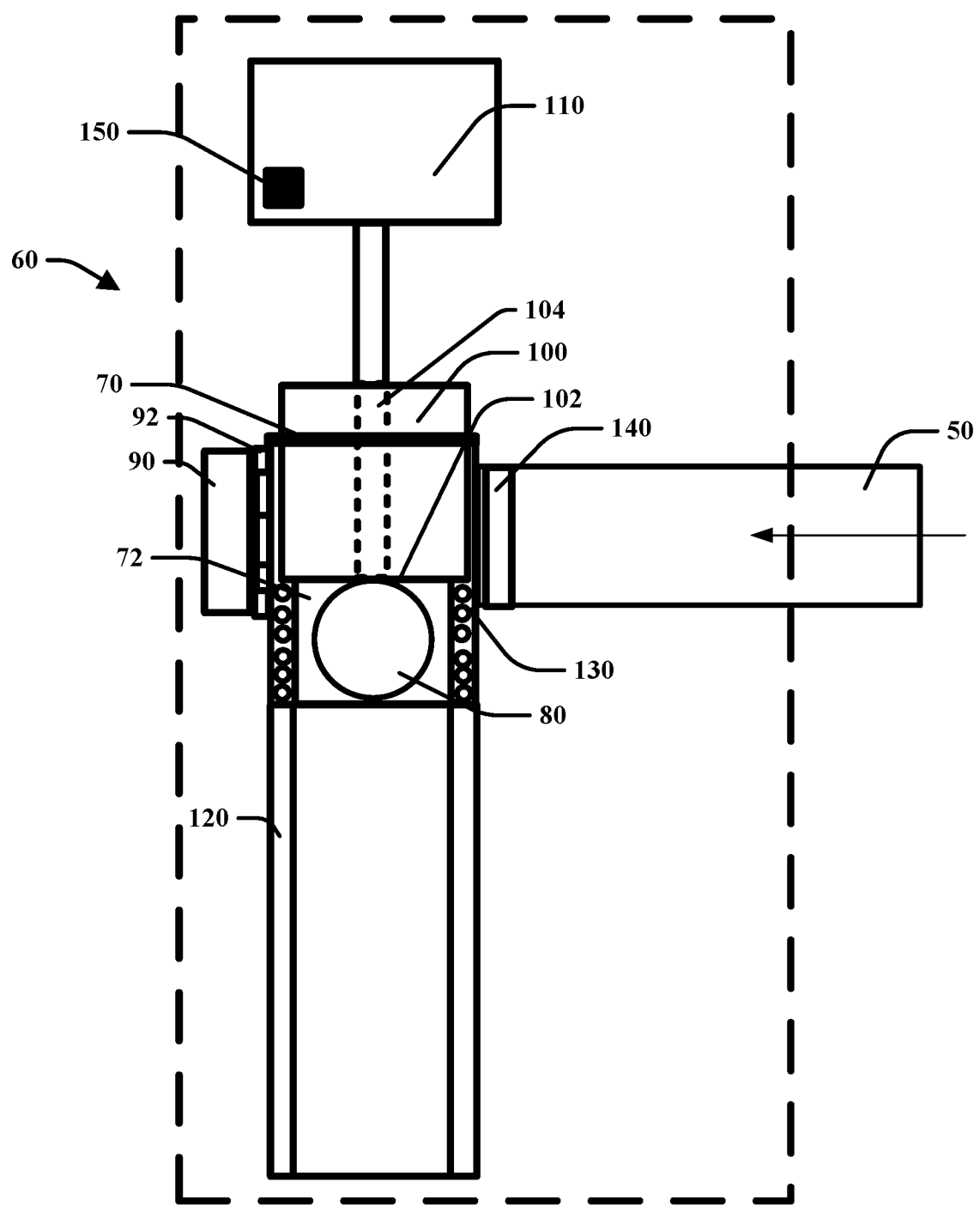
Figure 5:
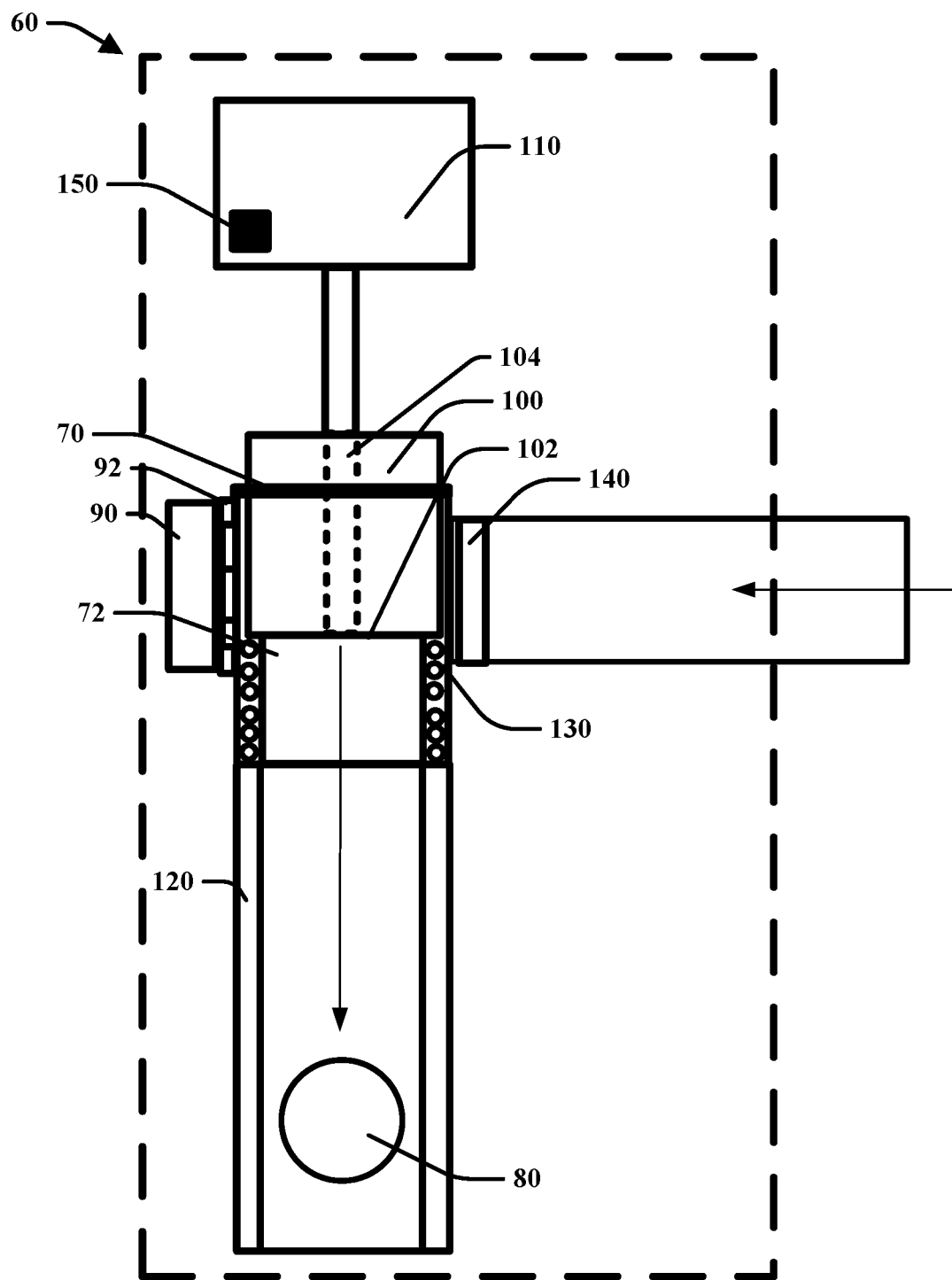

Further, the piston member 100 may be moveable relative to the body 70 between an open position (FIGS. 2 and 3) to a recessed position (FIGS. 4 and 5). In the open position, the cavity 72 is configured to receive product 80 therein while in the recessed position, the product 80 may be within the cavity 72. In the recessed position, the product 80 may be spaced from the vacuum member 90 while abutting against the surface 102 of the piston member 100. The piston member 100 may also block the distribution channel 50 in the recessed position. The check member 140 may be a metering device for allowing only one product or seed to enter into the cavity at a time. The biasing member 130 may assist with moving the piston member.

FIG. 3 illustrates the product 80 positioned within the cavity 72. Here, the piston member 100 may be maintained in the open position and the product 80 may abut against the surface 102 of the piston member. The check member 140 may be in the closed position to assist to meter product 80 within the cavity 72 and to reduce risk of clogging.

FIG. 4 illustrates when the piston member 100 is in the recessed position and the product abuts against the surface 102 of the piston member 100. In this embodiment, the vacuum member 90 may be applying constant pressure in which it may allow the product to be maintained in this position. Further, the check member 140 may be in the closed position. The variable pressure device 110 may control the piston member 100 to translate the piston member in the recessed position. In embodiments with the biasing member 130, the piston member 100 presses against the bias force to be placed in the recessed position.

As illustrated by FIG. 5, the variable pressure device 110 provides an output of pneumatic pressure within the cavity 72 to propel the product 80 through the barrel 120. The control device 150 may allow for electronic communication with a network. The network may communicate information to the control device 150 of the distribution assembly 10 to control the variable pressure device 110 and to discharge the product at a desired speed in order to properly plant the seed within the ground. Additionally, the control device 150 may communication with the aerial vehicle 20 and may include a GPS or DGPS unit to communicate with the network or other devices. The control of the amount of pressure may be a function of the desired depth to plant the seed and this information may be programmed or otherwise communication to the control device 150. The information provided by the network may include the location of the distribution assembly 10 or the aerial vehicle 20, the current speed of the aerial vehicle, the soil type below the aerial vehicle or the soil type that is to be planted, the moisture content within the soil, or other similar information to allow the distribution device to control the speed in which product is propelled therefrom. This information may be provided to the control device 150 as the aerial vehicle 20 is being operated over land to receive the product.

In one embodiment, the control device 150 may receive constant stream of information as the aerial vehicle flies over the soil to be planted. The distribution assembly 10 may communicate with various systems that may identify the types of soils and the level of moisture of the soil. As the aerial vehicle traverses the terrain, the differences in the types and moisture level of soil may be communicated to the control device 150 of the distribution assembly 10 as well as precise location of the distribution assembly 10 in relation to the ground. The control device 150 may send a signal to the variable pressure device 110 to provide a desired amount of pressure to propel the product 80 towards the soil.

Figure 6:
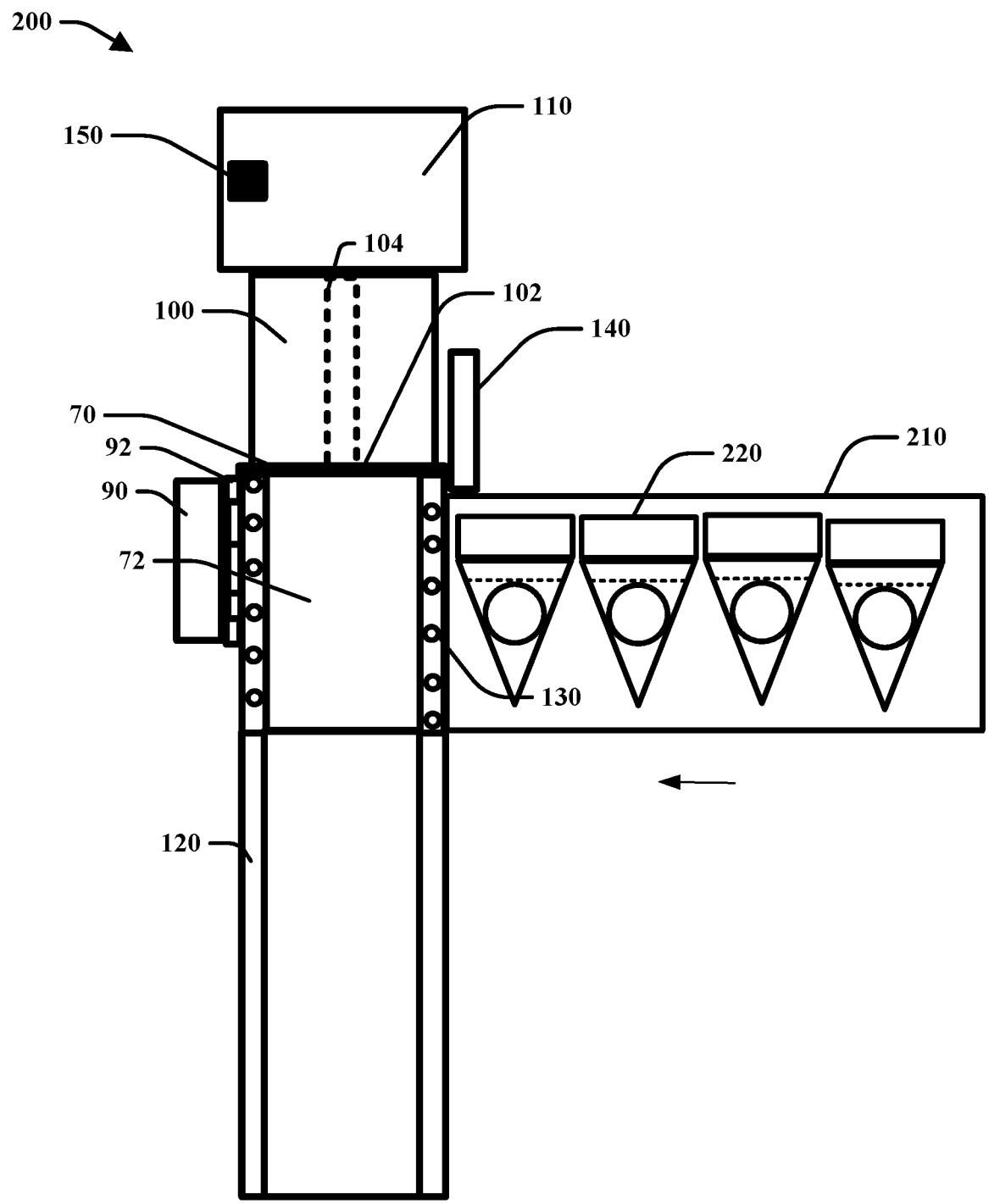
Figure 7:
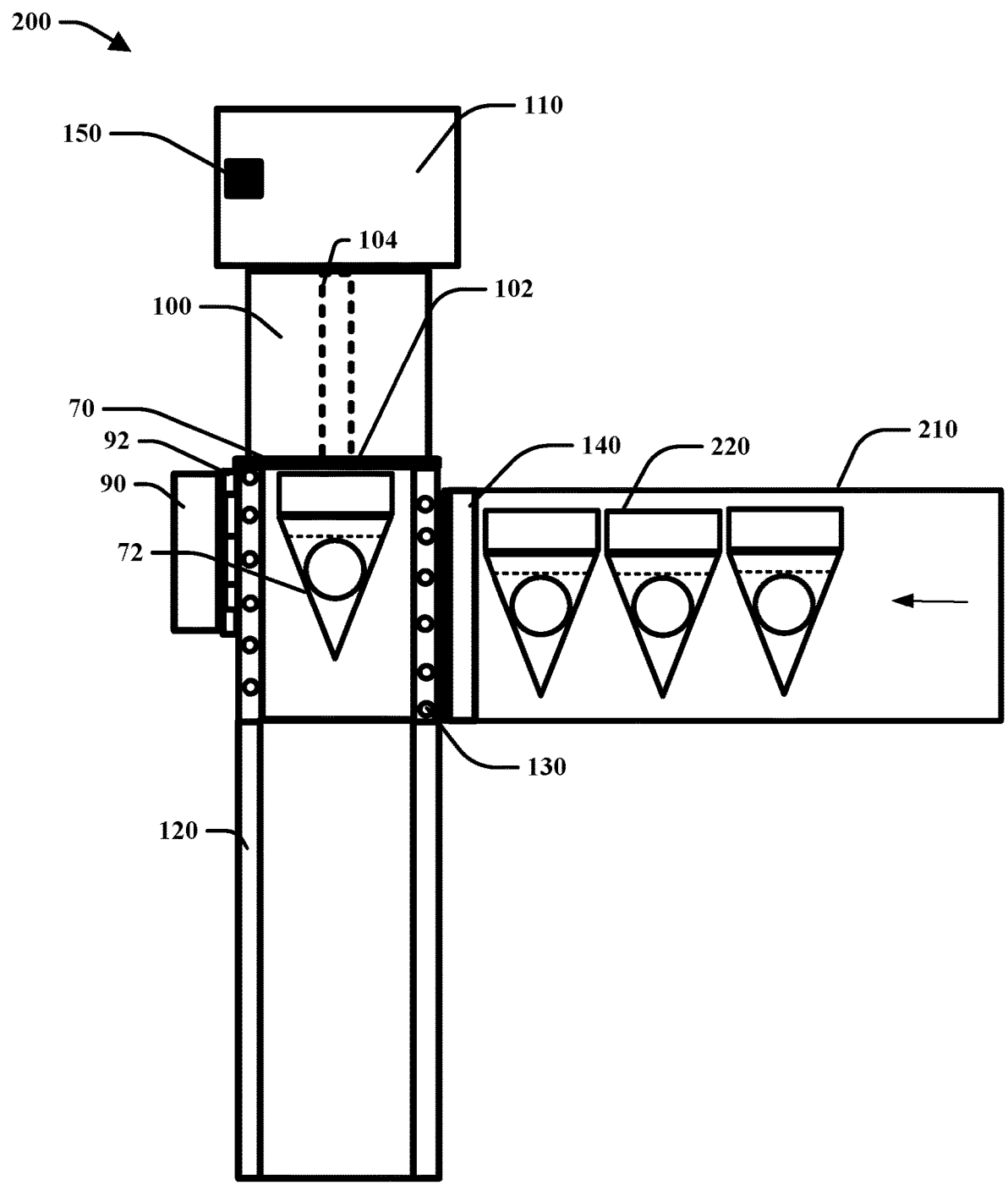
Figure 8:
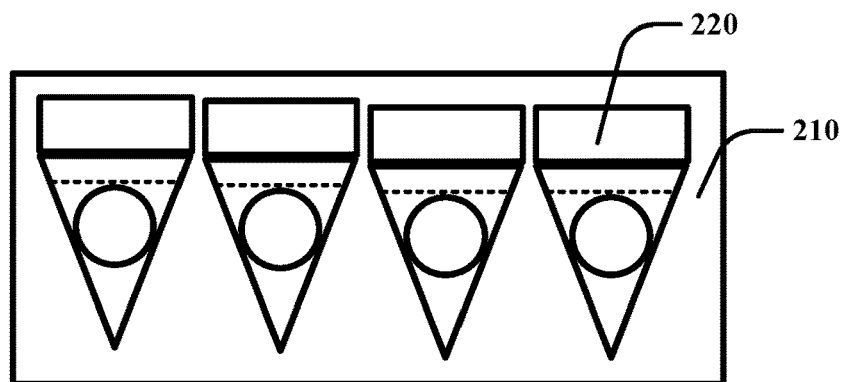
Figure 9:
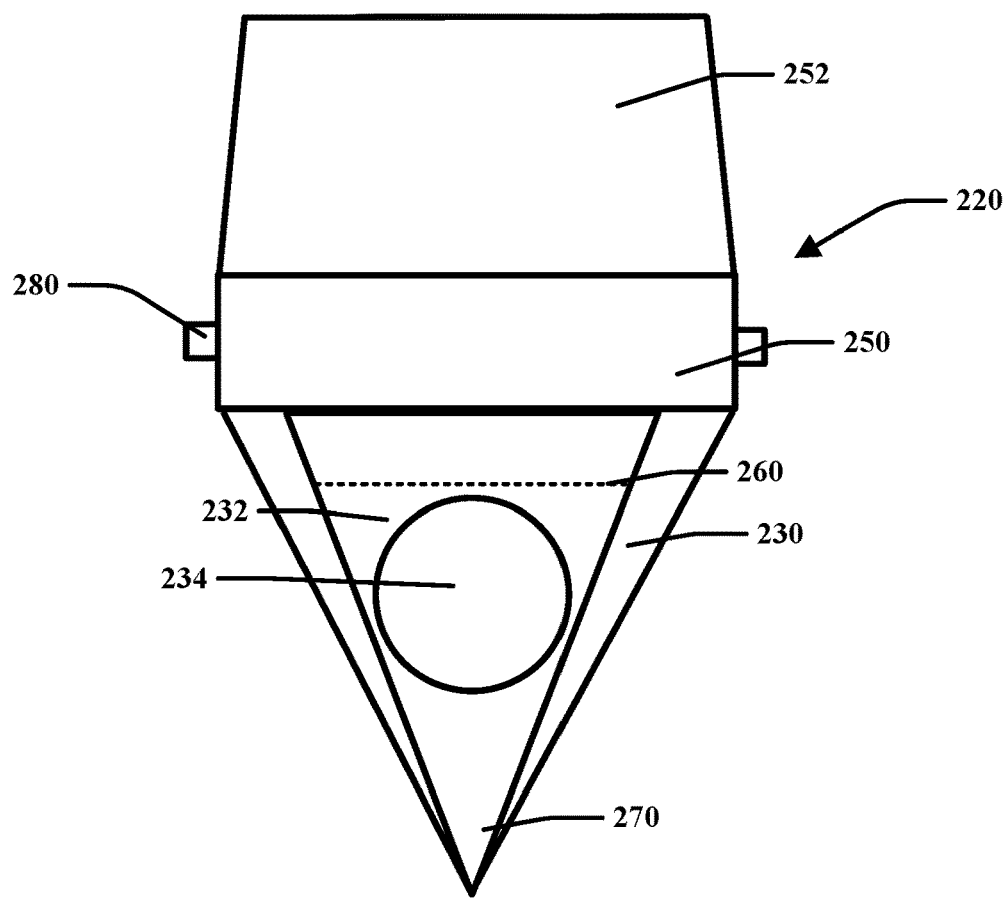
Figure 10:
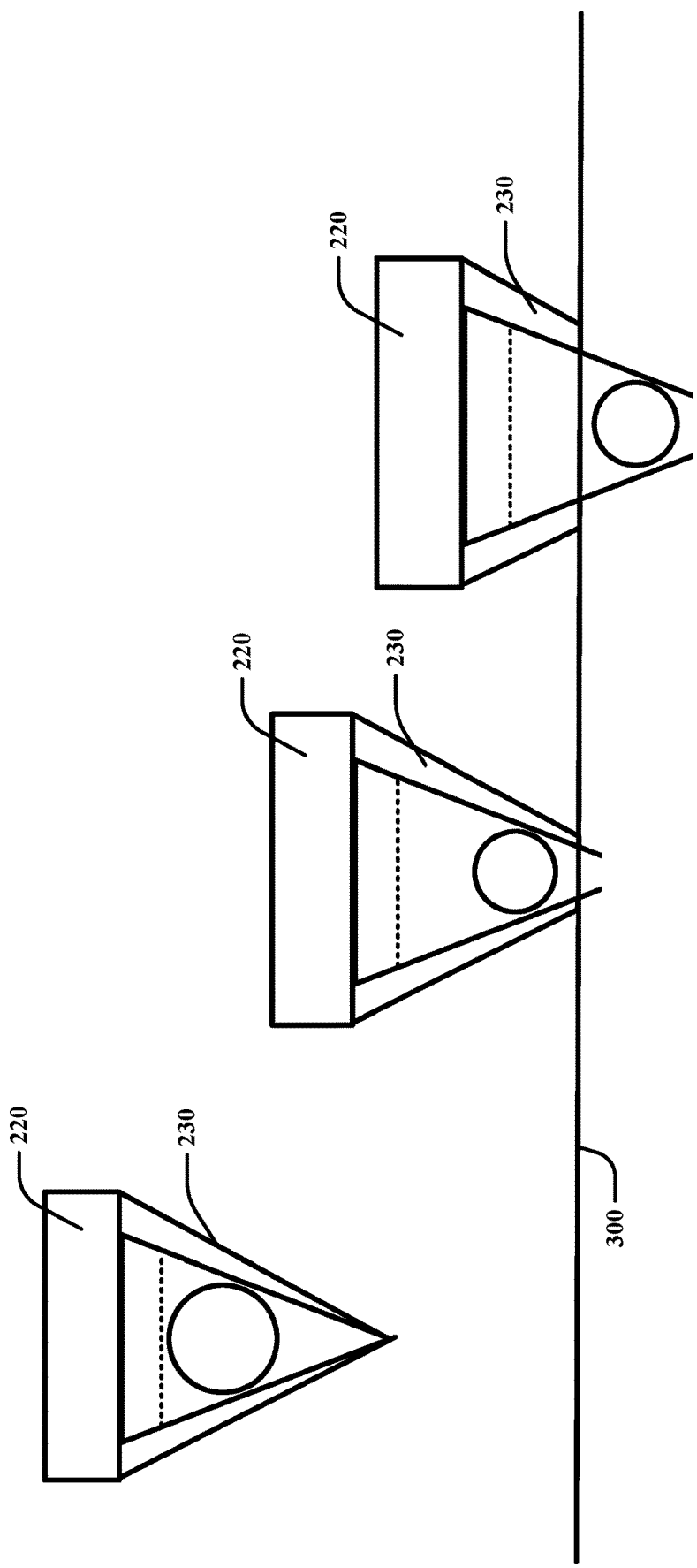
Figure 11:
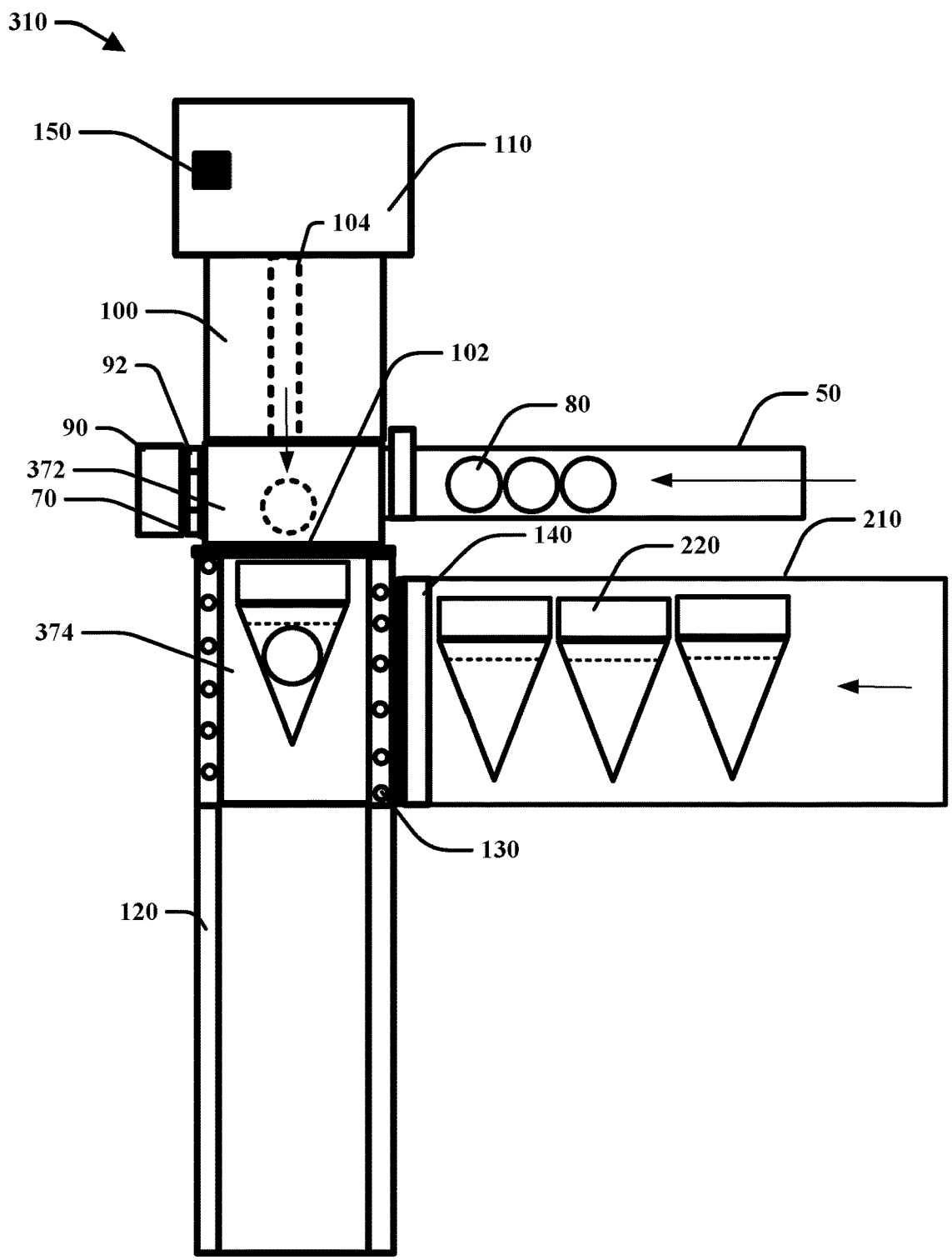
Figure 12A:
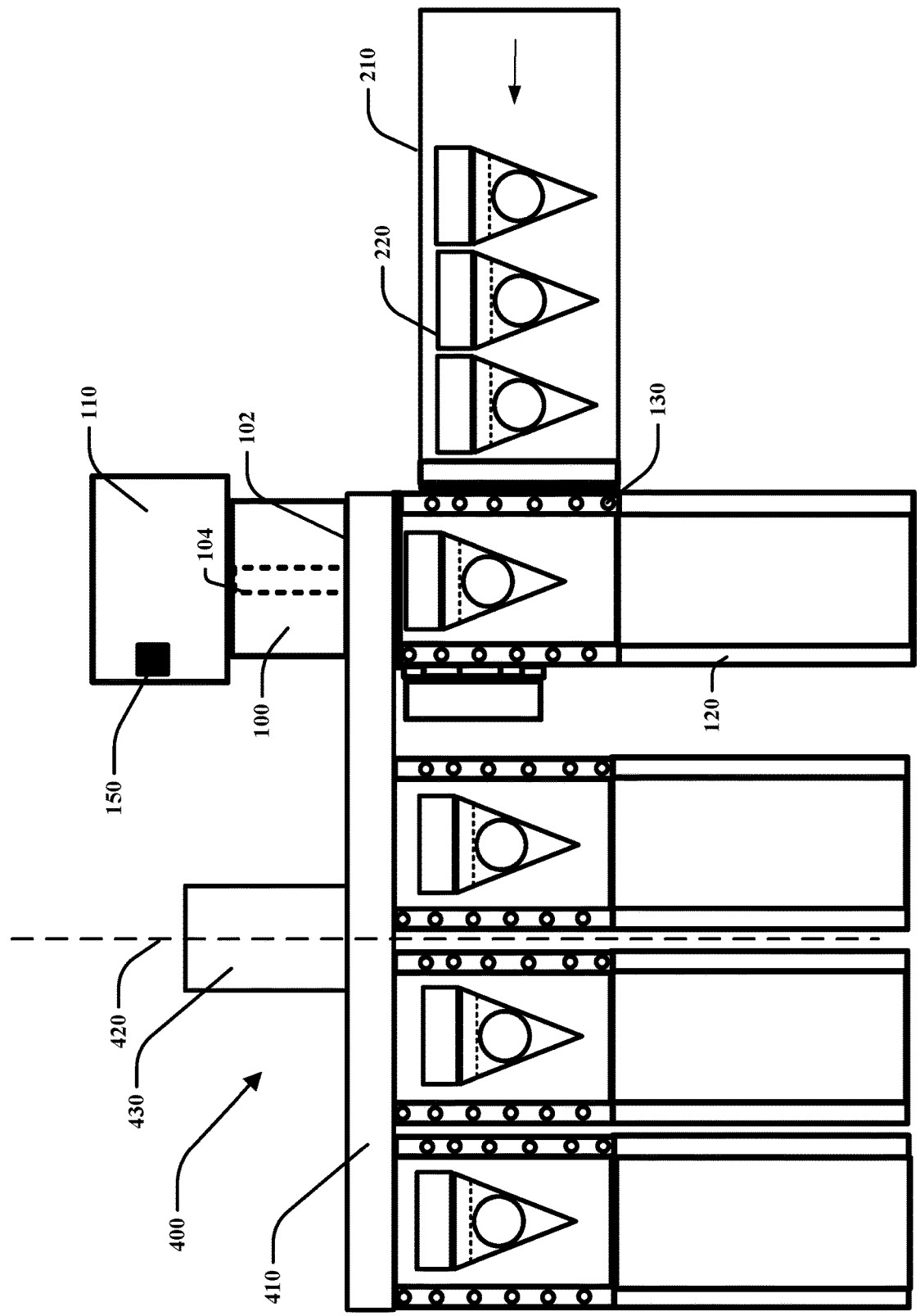
Figure 12B:
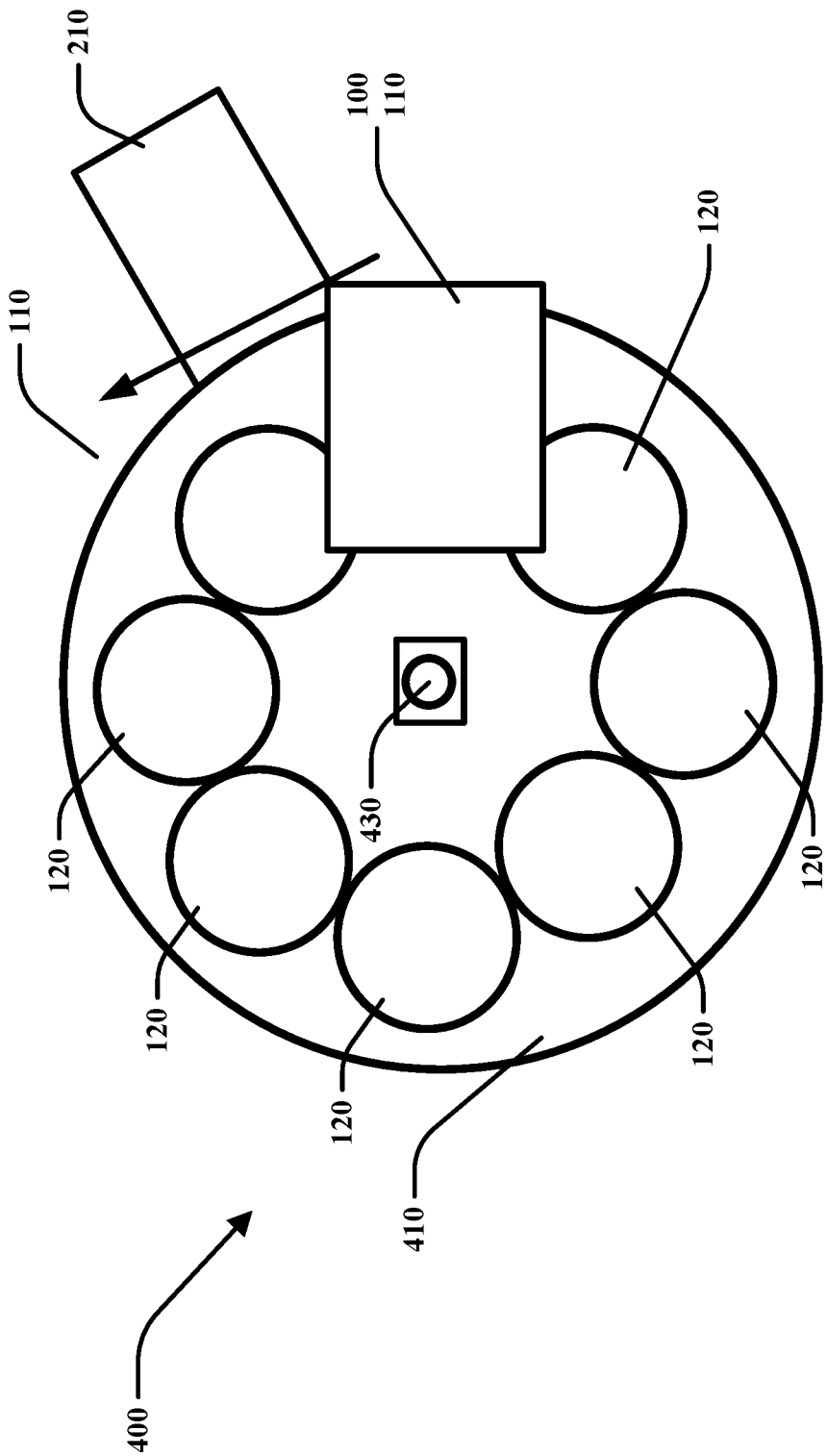
Figure 13:
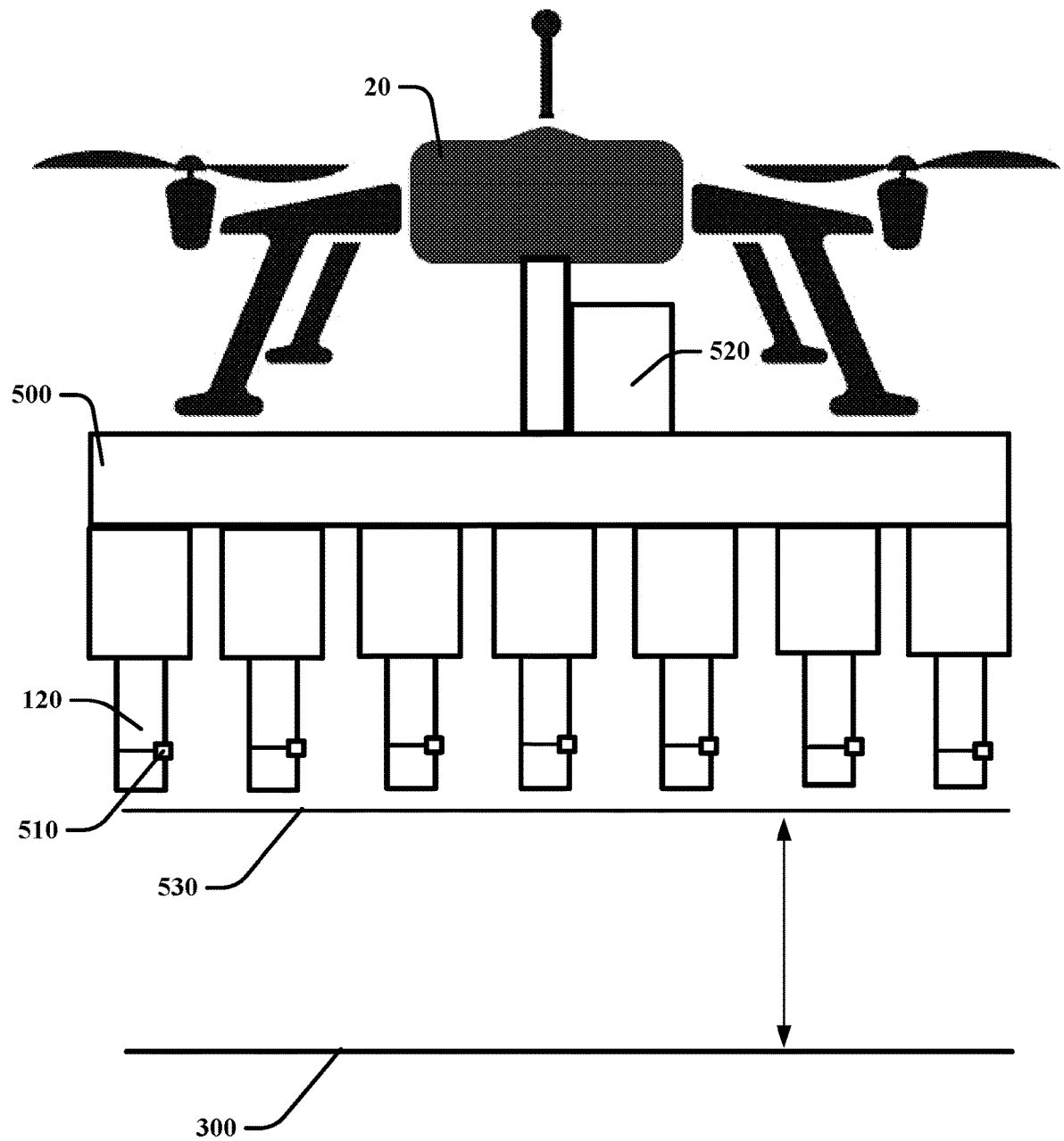

In another embodiment illustrated by FIGS. 6 and 7, a distribution device 200 may be utilized to receive and project cartridges that include seed therein. In this embodiment, the product 220 is a cartridge device having a generally hollow cartridge body 230 for housing a seed 240. This embodiment of the products 220 are illustrated by FIGS. 8-10. The distribution device 200 may be attached to a cartridge assembly 210, such as a sleeve, having a plurality of cartridge devices 220 therein as illustrated by FIG. 8. In this embodiment, the product 220 may be drawn into the cavity 72 of the distribution device 200 similar to the discussion above. Alternatively, the distribution device 200 may be loaded with cartridge devices 220 by mechanical means that utilizes a biasing member or device that applies a bias force to meter cartridge devices 220 from the cartridge assembly 210 into the cavity 72. As illustrated by FIG. 7, the product 220 may be positioned within the cavity 72 and propelled from the barrel by the actuation of the variable pressure device 110. The barrel may include riflings or inner surface mounted protrusions to assist with propelling the cartridge device therefrom in a rotating manner. In the same regard, the cartridge device may include surface mounted protrusions, such as threads, along the outer perimeter surface to assist with burying into the soil as it is received therein.

Turning to FIG. 9, the cartridge body 230 may include a cavity 232 for receiving or supporting at least one seed 234 therein having a ground stop member 250, an adjustment member 260 and a tapered end 270. The cartridge body 230 may have a variety of shapes to assist with aerodynamic projectile and this disclosure is not limited. In one embodiment, the tapered end 270 may be open and in another embodiment, the tapered end may be closed. The cartridge device 220 may be pre-loaded with seed or also with material such as fungicide, insecticide, or fertilizer and this disclosure is not limited in this regard. The cartridge device 220 may include a retainer portion 280 that may protrude from or be recessed from the sides of the cartridge device 220 to allow for positioning and aligning within the cartridge assembly 210 and within the inner passageway of the distribution device. The retainer portion 280 may be a small annular ring that circumscribes at least of portion of the cartridge and may be received in complimentary shaped recesses within the assembly 210 and distribution devices. Alternatively, the retainer member 280 may be a recessed portion such as an annular groove that along a portion of the cartridge and may receive a complimentary shaped protrusion within the assembly 210 and distribution devices. The cartridge device 220 may also include a skirt 252 that extends from the back of the device and assists with projectile trajectory. The cartridge device 220 may include a range of lengths depending on application in which the device may be about ⅛" to about 6" long or may be about 1" to about 4" long or may be about 1" to about 3" long. Further, the cartridge device 220 may include a range of perimeter widths depending on application in which the device may be about ⅛" to about 3" wide, or may be about ½" to about 2" wide.

The cartridge device 220 may also include a tracer material located on or within the cartridge device 220. The tracer material may be biodegradable and may allow for tracking of the cartridge device 220 after being discharged by the distribution device wherein an imaging device (i.e., a plant counting image device to count seeds at a high rate of speed) may be able to easily view, sense, or identify the tracer material to identify areas in the land 300 that may or may not have a cartridge device 220 planted within the ground 300. In this instance, a scout drone or alternate aerial vehicle may scout or retrace the flight path of the aerial vehicle 20 with the distribution assembly 10 to identify missed or skipped areas. The scout drone or alternate aerial vehicle may include a single distribution device or a plurality of distribution devices to precisely plant a cartridge device 220 in identified areas without a cartridge device 220. Alternatively, the aerial vehicle 20 with the distribution assembly 10 may retrace its flight path to plant cartridge devices 220 at identified missed areas.

As illustrated by the FIG. 10, the cartridge body 230 may be made from a compressible aerodynamic membrane such that once a portion of the cartridge body 230 enters into the soil, that portion of the cartridge body 230 may contort in a designed manner such that the cartridge body may open to allow the seed to be discharged into a desired depth within the soil. In one embodiment, the cartridge device 220 may be made of a collagen material that may be rigid to receive a seed therein and be propelled from the distribution device but may contort or disintegrate once received in the soil. The ground stop member 250 may prevent the cartridge body 230 from entering the ground 300 any further than the ground stop member 250. The adjustment member 260 may be designed to modify the desired depth within the soil that the seed may be planted after being discharged by the distribution device 200. The adjustment member 260 as well as the size of the cartridge body 230 may be configured for the shapes of various seed types and for the desired length and depth of desired seed planting depths. The shape of the cartridge device 220 may be formed from a continuous material that may be sprayed with an activator spray once formed to maintain its shape and to begin its conformation once it enters the soil. The shape of the cartridge device 220 may be varied for the type of product that is to be distributed therefrom as well as to account for its propulsion from the distribution device. The cartridge device 220 may also be made of a biodegradable material such as a polymer or collagen that may be recyclable. It is desirable that the material may not cause toxicity to the environment or otherwise negatively affect the soil, can maintain its structural integrity as it is stored in the cartridge assembly 210 and ejected through the barrel 120, while also degrading once ejected into the soil. The cartridge device 220 material may be sprayed with an activator solution to activate the degradation process of the cartridge material. The activator solution may assist to degrade the material when in the soil and be based on the level of water or moisture that may exist in the ground 300. The cartridge device 220 material may be hydrophobic and/or hydrophilic and may be capable of degrading at a controlled and known rate based on the level of water or moisture measured or predicted in the soil. This feature allows a user to select the appropriate type of material of the cartridge device 220 based on an identified or predicted level of moisture in the ground. The activator solution may be applied to the cartridge device 220 during the use of the distribution assembly 10 and may be applied before the cartridge device 220 has been loaded into the distribution device or as the cartridge device 220 exits from the barrel 120.

In another embodiment as illustrated by FIG. 11, a distribution device 310 may include a configuration to allow for both cartridge devices 220 and seeds 80 to be separately received within a cavity of the housing 70. Here, the distribution device 310 may be configured to receive a seed 80 in an upper cavity 372 and may receive a cartridge device 220 within a lower cavity 374, to position the seed 80 within the cartridge device 220, and to propel the cartridge device with the seed therein from the distribution device 310. In this embodiment, the distribution device 310 is enlarged to allow for receiving a plurality of seeds in a metered configuration above a plurality of cartridge devices in a metered configuration. The cartridge devices of this embodiment may include an opening within the rear portion to receive a seed therein and to retain a seed as it is being propelled and as it travels through the air. Similarly, as this cartridge device impacts the soil, it may contort to provide the seed at a desired depth within the soil.

In another embodiment as illustrated by FIGS. 12A and 12B, the distribution device 400 may include a plurality of barrels 120 positioned along a rotatable member 410. The rotatable member 410 may be rotated about an axis 420 driven by a rotation device 430. The rotation device 430 may be an electric motor or pneumatic powered device. The rotatable member 410 may be activated to position a plurality of barrels 120 into alignment with the discharge mechanisms including the variable pressure device 110 and piston member 100. Additionally, the rotatable member 410 may be able to position the plurality of barrels 120 into alignment with the cartridge assembly 210 to reload the barrels 120 with product or cartridge devices 220 after having been discharged. The motor 430 and control device 150 may communicate to coordinate timing to distribute the desired number of cartridge devices or product as the distribution assembly 10 is traversing the ground. The rotatable member 410 may have three barrels 120, five barrels 120, seven barrels 120 and any number of barrels 120 positioned on the rotatable member 410 are contemplated by this disclosure.

In one embodiment, the plurality of distribution devices 60, 200, 310, 400 of the distribution assembly 10 may be structurally mounted to a frame 500 as illustrated by FIGS. 13 and 14. The frame 500 may be attached to the aerial vehicle 20. The frame 500 may be adjustable to direct the barrel 120 of each distribution devices towards the soil in the ground 300 at various angles. Alternatively, the barrels 120 and distribution devices may be designed to be mounted along the frame 500 to allow for various angles of the barrel 120. The direction of the barrels 120 and the changing angles may also be automatically controlled by the control device 150 to modify the trajectory of the product 80, 220 or cartridge devices 220 as they are propelled from the distribution devices 60, 200, 310, 400. Notably, any number and configuration of distribution devices is contemplated by this disclosure.

FIG. 13 illustrates an embodiment in which an applicator device 510 may be added to the barrels 120. The applicator device 510 may be a ring assembly having spray nozzles that are directed inwardly about the inside perimeter of the barrels 120 to apply the activator solution to the cartridge devices 220 as they are distributed from the barrel 120. The activator solution may be stored in a tank 520 positioned on the frame 500 and fluidly communicated to the respective applicator device 510 positioned on the barrels 120. The activator solution activates the membrane material of the cartridge device to begin degradation at a desired rate as it enters the soil based on soil moisture content. The applicator device 510 having its ring and nozzles may be at or near the end of the barrel 120 so as the cartridge exits the barrel it would pass through the activator solution.

FIG. 13 also illustrates a method of using the distribution assembly 10 as a way to distribute seeds over a field without ground contact. This may be useful for distributing seeds, or product over a field that includes existing crops. Here the distribution assembly 10 and aerial vehicle 20 maintain a flight pattern above a height level 530 of existing crops above the ground 300. The flight pattern may be at a common height above the crop height level 530 and the aerial vehicle 20 may be programmed or remotely controlled to include a flight pattern that adjusts to distribute the product or cartridge device along a crop path along the ground. As such, the flight path may be adjusted for speed and include a slight zig-zag flight path to account for the aim of the barrel relative to the desired location along the ground 300 to receive product or cartridge device. This configuration improves germination without damage to existing field.

Figure 14:
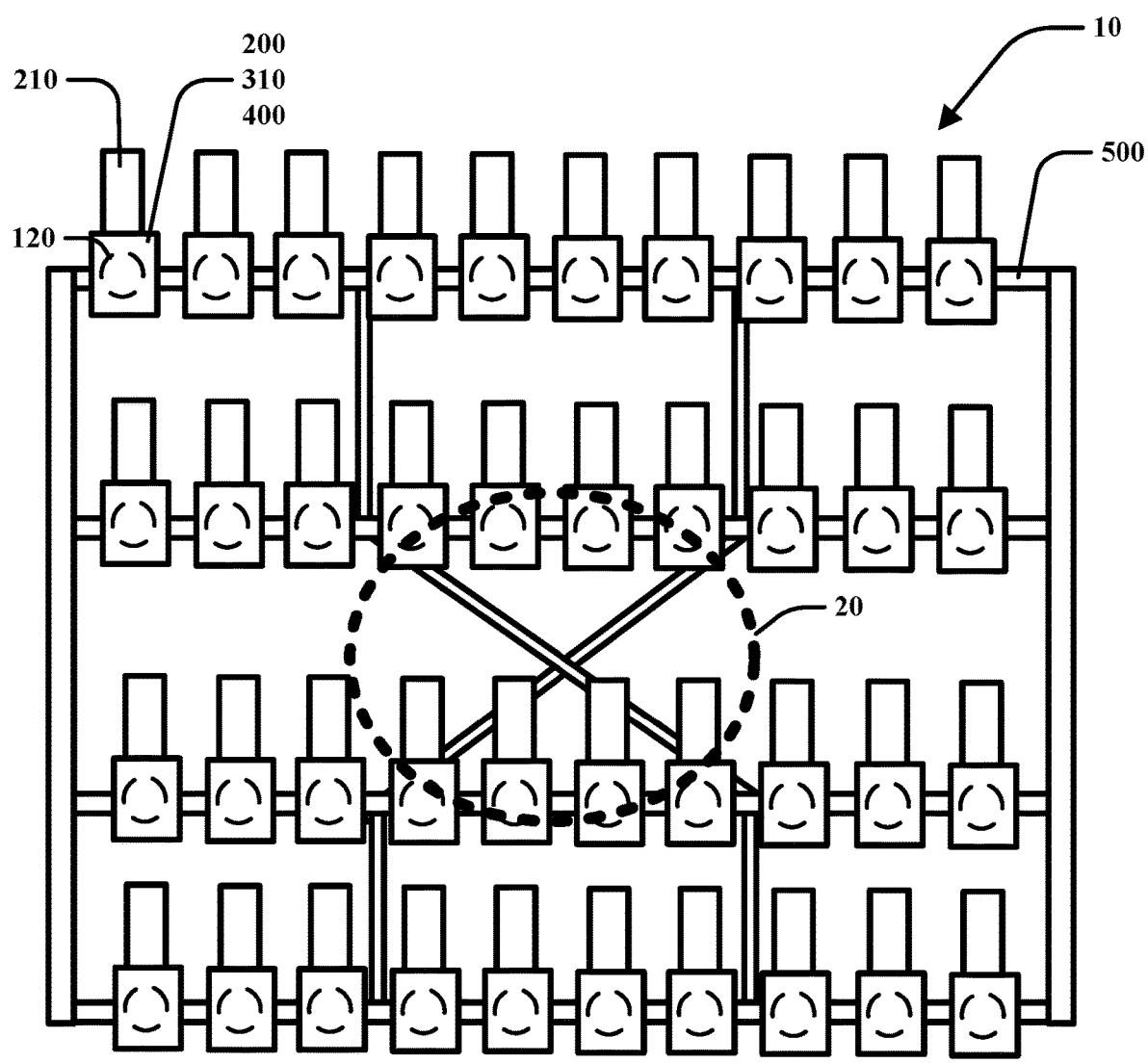

FIG. 14 illustrates a schematic top view of an embodiment of the distribution assembly 10 having the frame 500 with a plurality of distribution devices. In one embodiment, there may be between one to ten rows of distribution devices arranged along a width of the frame 500 that is part of the distribution assembly 10. Each row may include a plurality of distribution devices 60, 200, 310, 400 aligned therein. FIG. 14 illustrates an embodiment having ten (10) distribution devices along four (4) rows. However, it is contemplated that there may exist any number of rows from one (1) to about fifty (50) and any number of distribution devices from one (1) to about two hundred and forty (240) per row. The row spacing may be adjustable based on the desired application (i.e., planting beans may be spaced about 10 inches to about 30 inches; planting corn may be spaced from about 20 inches to about 36 inches).

As illustrated by FIG. 15, the distribution assembly 10 may be provided with a ground contact assembly 600. The ground contact assembly 600 may incorporate use of the distribution assembly 10 without an aerial device 20 in which is may be implemented to distribute seeds, product, cartridge devices, fertilizer to a field that is barred or does not have existing crops thereon. The ground contact assembly 600 includes a front device 610 that includes an arm 620 that extends from the frame of the distribution assembly 10 at a hinge 622 to reach the ground 300. The arm 620 may be spring loaded along the hinge 622 relative to the frame 500 and may be pressure adjustable. The front device 610 includes a furrow device 630 that attached to the arm 620 is configured to be positioned within the ground to clear a path to move soil along a desirable planting crop pattern. The furrow device 630 may be a plow like device having a triangular shape that is insertable within the ground and made of a rigid material such as metal, alloy or titanium. In one embodiment, the furrow device 630 creates about a 2" wide trench in the ground but this disclosure is not limited to the size or configuration of the furrow 630. The pressure applied to the furrow 630 by the arm 620 may be adjustable to ensure the position of the furrow 630 within the ground may be adjusted during operation. The furrow may clear out debris and soil.

Figures 15A, 15B:
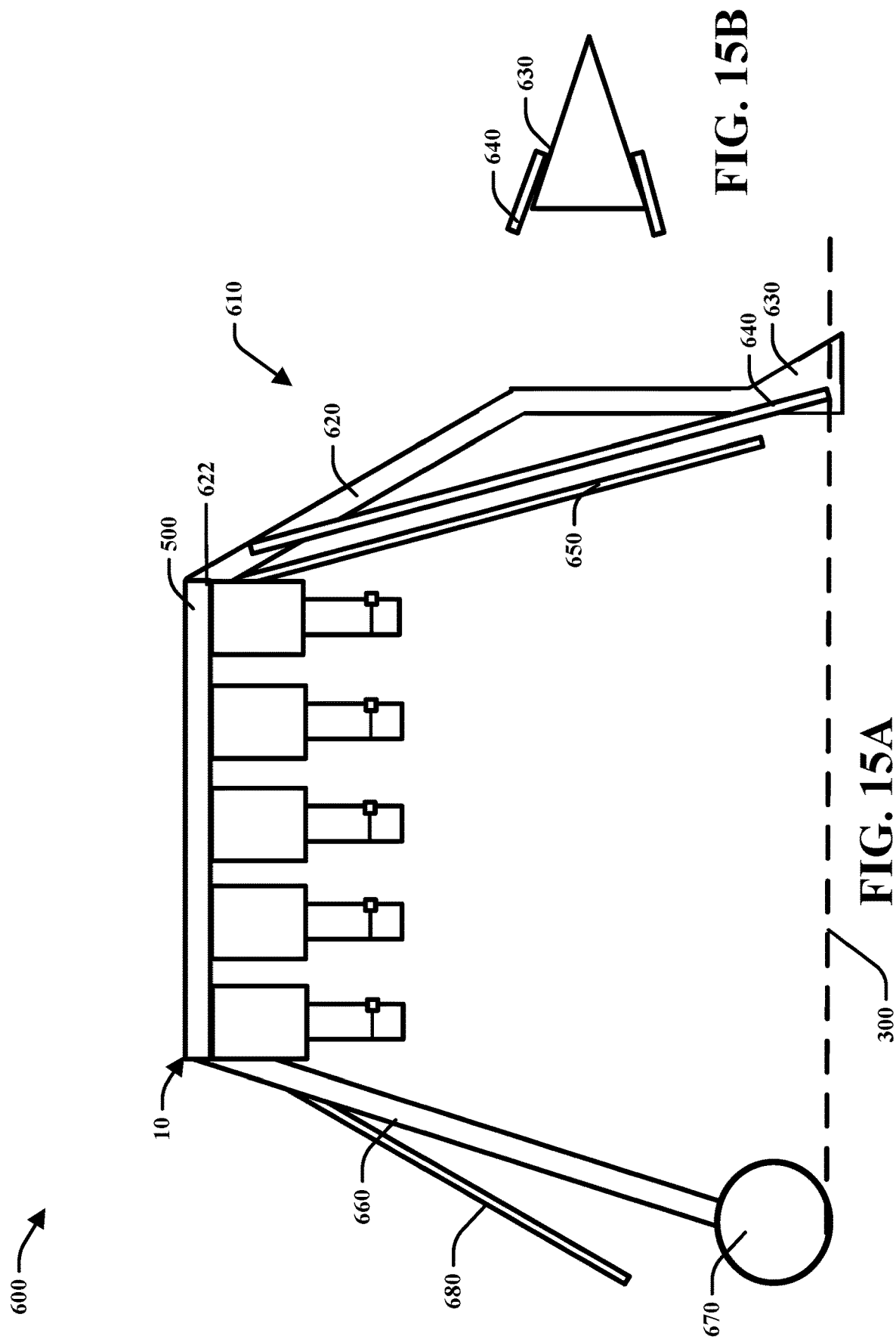

The furrow device 630 may include at least one first distribution assembly 640 such as an anhydrous knife dispensing assembly may be used to dispense anhydrous chemicals adjacent either side of the furrow device 630. FIG. 15B illustrates a top view of the furrow device 630 that includes two first distribution assemblies 640 positioned along either side thereof. Additionally, a second distribution assembly 650 may be provided behind the furrow device 630 that is adapted to dispense liquid fertilizer within the trench created by the furrow device 630. The distribution assembly 10 may then be controlled to dispense seed, product, or cartridge devices within the trench created by the furrow device 630.

The ground contact assembly 600 includes a rear device 660 that includes an arm 660 that extends from the frame 500 of the distribution assembly 10 to reach the ground 300. Wheels 670 are provided along the end of the arm 660 to support the ground contact assembly 600 and allow operation of the system. The rear device 660 may include a third distribution assembly to distribute further fertilization chemicals after the distribution assembly 10. The third distribution assembly 680 may include a rotary granular application. The ground contact assembly 600 maybe operated with an aerial vehicle 20 such as a UAV or may be operated with a ground vehicle that may also be unmanned. The ground contact assembly 600 may include a variety of configurations having a plurality of wheels for structural stability. The ground contact assembly 600 may allow fro the frame 500 to support a large number of distribution devices thereon and is configurable to support a large number of rows of distribution devices.

The embodiments disclosed herein may be used as a system for planting crops in a field in an improved manner from existing systems. The system may be executed automatically using various modules and logic programmed in computer devices and communicated over a network to the aerial vehicle 20 or may be operated manually be a user with a remote located computer device. The control device 150 may be programmed to communicate with the components of the distribution assembly 10 to propel product (such as cartridge devices 220) from each of the plurality of barrels 120 of the plurality of distribution devices 60, 200, 310, 400 in a timed and controlled manner. This operation may be a function of the speed of the aerial vehicle 20 and the desired spacing between each planted or distributed product. The spacing of planted product may be adjusted and controlled by a logic which may be communicated to the aerial vehicle 20 and distribution assembly 10 though the control device 150. The logic communicated to the control device 150 may include a flight control module 450, an area mapping module 550 and a distribution device control module 750. These modules may include various algorithms programed to work together to propel product from the plurality of distribution devices in a timed manner to achieve desired spacing of planted product at desired depths relative to the speed of the aerial vehicle.

Figure 16:
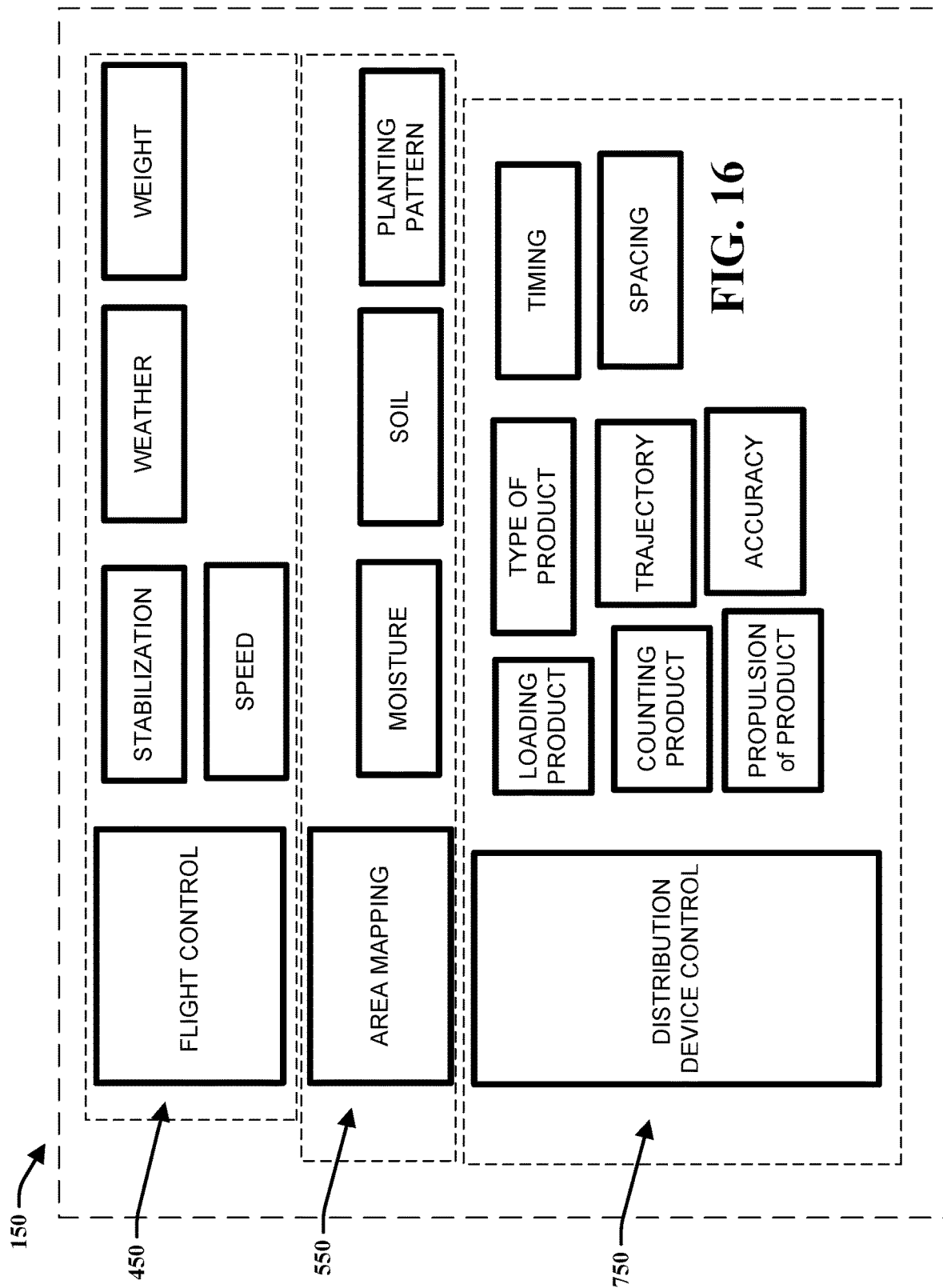

The organizational structure of the logic communicated to the control device 150 is illustrated by FIG. 16. Here, the speed of the vehicle may be set or adjusted by the flight control module 450 or set remotely by the user. The flight control module 450 may communicate with sensors to analyze data for the control of the flight of the aerial vehicle. The data may include stabilization of the aerial vehicle, weather (both past, present, and projected) weight of the aerial vehicle and product payload, and the programmed, actual or adjusted speed of the aerial vehicle. The desired spacing and desired depth of the product to be planted may be selectively input by the user or otherwise identified by the area mapping module 550. The area mapping module 550 may communicate with sensors to analyze data to determine a flight path of the aerial vehicle and to determine where to plant product in the field. This information may be sensed or also provided as an input by the user and includes soil type, moisture content, field terrain, and planting pattern. The distribution device control module 750 may communicate with sensors to analyze data to determine the desired control of the distribution devices. The data analyzed may include how management of product occurs including an accounting of stored product, loaded product, as well as timing related to when to propelled product from a particular distribution device located on the frame aligned in a desired position in the field, as well as the type of product, trajectory of the product, accuracy of the propelled product relative to the desired location, the timing of propelling a plurality of distribution devices, and the relative spacing between propelled product and landed product in the field.

In one example, an aerial vehicle 20 may be manually operated, remotely controlled, or automatically programmed to fly along a flight pattern over a field intended to receive planted crops for farming purposes. The aerial vehicle 20 may be attached to the distribution assembly 10 that includes a plurality of distribution devices 60 aligned in a desired arrangement along a frame 500. The aerial vehicle 20 may be flying at a desired speed (e.g. 40 miles per hour) to plant corn seeds in particular rows in the field having a desired spacing along each row in the field. The aerial vehicle 20 and distribution assembly 10 may communicate with the control device 150 which may be wirelessly communicating with a server or other computer device through a network. The control device 150, network, or computer device, may include the logic including the modules 450, 550, 750 or algorithms stored on memory. The modules are configured to process a variety of information to allow for automated operation of the system. The control device 150 may be in communication with a plurality of sensors to receive and process data to precisely and automatically control the operation of the aerial vehicle and distribution assembly. The timing algorithm considers a variety of characteristics of the environment including the type of product, soil quality, level of moisture in the soil, and whether to determine which, of the plurality of distribution devices, propels a product as the aerial vehicle travels at a desired and adjustable speed to achieve proper spacing of product in the field as well as proper depth of penetration of product in the soil.

The control device 150 may continuously monitor the aerial vehicle 20 and distribution assembly 10 and a variety of factors to ensure stabilization, flight pattern accuracy, control of distributed product, product count, accuracy of distributed product, etc. The communication between the control device 150 and the various components described herein allow for the control of the aerial vehicle 20 to be coordinated to ensure stabilization during flight as well as accurate distribution of product in the desired manner. The weight and configuration of the distribution assembly 10 and aerial vehicle 20 may require adjustments for a successful flight and the disclosed system accounts for the variety of sizes and weights of the system. The control device 150 may undergo a load stabilization step that may account for various characteristics to allow for adjustments and operational control of the aerial vehicle 20 and distribution assembly 10. These characteristics may include but are not limited to: air data, flight path, altitude, pitch, roll, yaw, gyroscopic forces, GPS, inertia, outside atmosphere conditions both calculated and observed. These characteristics may be included in the programmable logic or algorithm to allow for automatic stabilization. The control device 150 may also include a programmable logic or algorithm that includes a guidance system to assist with operating the aerial vehicle 20. The guidance systems may include a DGPS, Inertial Navigation Signal, cellphone compatible GPS, marker stakes positioned on a field, or single satellite GPS. The control device 150, remote computing device, or server may be programmed to include a logic or algorithm that utilizes the guidance system, timing algorithm, and load stabilization steps to automatically align the aerial vehicle 20 and plurality of distribution devices to operate the aerial vehicle 20 and to propel product therefrom in a timed and controlled manner to sufficiently place product within the soil of the field. The algorithms may be a logic programmed into memory stored on the control device 150 or communicated to the control device 150 and aerial vehicle 20 over a network from a remote location or device such as a cell phone, computer, tablet, or server.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The control device 150 may communicate to various computers, devices, or servers through a communication framework having the ability to communicate through a wireless network. Communication connection(s) may include devices or components capable of connecting to a network. For instance, communication connection(s) may include cellular antennas, satellites, wireless antennas, wired connections, and the like. Such communication connection (s) may connect to networks via the communication framework. The networks may include wide area networks, local area networks, facility or enterprise wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework may include multiple networks connected together. For instance, a Wi-Fi network may be connected to a wired Ethernet network.

Claim statements for a cartridge device:

A cartridge device comprising:

a generally hollow cartridge body that includes a cavity for receiving and supporting at least one seed wherein the cartridge body is shaped as and aerodynamic projectile; and a tapered end extending from the cartridge body, said tapered end includes at least one of an open portion or a continuous closed portion;

wherein the cartridge body is configured to be discharged from a barrel of a distribution device and to be lodged within soil to deploy the seed at a predetermined depth in the soil.

The cartridge device of any preceding claim wherein the cavity is pre-loaded with a chemical material, wherein the chemical material includes at least one of a fungicide, a insecticide, and a fertilizer.

The cartridge device of any preceding claim further comprising surface mounted protrusions, such as threads, along an outer perimeter surface to assist with burying into the soil as it is received therein.

The cartridge device of any preceding claim further comprising a tracer material located on or within the cartridge device, wherein the tracer material is biodegradable and allows for tracking by an imaging device after being discharged by the distribution device.

The cartridge device of any preceding claim wherein the cartridge body is made from a compressible aerodynamic membrane such that once a portion of the cartridge body enters into the soil, that portion of the cartridge body contorts in a designed manner to open and allow the seed to be discharged into a desired depth within the soil.

The cartridge device of any preceding claim wherein the membrane is one of a continuous collagen material or polymer, wherein said membrane is rigid to receive and support a seed and be propelled from the distribution device; and wherein said material is configured to contort once received in the soil; and wherein said membrane is configured to begin decomposing after being sprayed by an activator spray based on the level of water that may exist in the soil.

The cartridge device of any preceding claim wherein the membrane is made of one of a hydrophobic or a hydrophilic material that is capable to degrade at a controlled and known rate based on the level of water measured in the soil.

The cartridge device of any preceding claim further comprising an adjustment member that is configured to modify the desired depth within the soil that the seed is planted after being discharged by the distribution device.

The cartridge device of any preceding claim further comprising a ground stop member positioned along the cartridge body to prevent the cartridge body from entering the soil further than the position of the ground stop member on the cartridge body.

The cartridge device of any preceding claim further comprising a retainer member that protrudes from a side of the cartridge body for alignment with a cartridge assembly and within an inner passageway of a distribution device.

Although the embodiments of the present disclosure have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof

I claim:

1. A cartridge device comprising:
a generally hollow cartridge body comprising a cavity for receiving and supporting at least one seed wherein the cartridge body comprises an aerodynamic projectile shape; and
a tapered end extending from the cartridge body, said tapered end comprises at least one of an open portion or a continuous closed portion;
wherein the cartridge body is dischargeable from a barrel of a distribution device to be lodged within soil to deploy the seed at a predetermined depth in the soil.

2. The cartridge device of claim 1, wherein the cavity is pre-loaded with a chemical material, wherein the chemical material includes at least one of a fungicide, a insecticide, and a fertilizer.

3. The cartridge device of claim 1 further comprising surface mounted protrusions, such as threads, along an outer perimeter surface of the cartridge body to assist with burying the cartridge body into the soil as it is received therein.

4. The cartridge device of claim 1, further comprising a tracer material located on or within the cartridge device and allows for tracking by an imaging device after the cartridge device has been discharged by the distribution device.

5. The cartridge device of claim 4, wherein the tracer material is biodegradable.

6. The cartridge device of claim 1, wherein the cartridge body is made from a compressible aerodynamic membrane that is configured to allow a portion of the cartridge body to contort in a designed manner to open and allow the seed to be discharged from the cartridge body into a desired depth within the soil.

7. The cartridge device of claim 6, wherein the compressible aerodynamic membrane is one of a continuous collagen material or polymer,
wherein said compressible aerodynamic membrane is rigid and configured to receive and support a seed and be propelled from the distribution device; and
wherein said compressible aerodynamic material is configured to contort once received in the soil; and
wherein said membrane is configured to begin decomposing after being sprayed by an activator spray based on the level of water that may exist in the soil.

8. The cartridge device of claim 6, wherein the compressible aerodynamic membrane is made of one of a hydrophobic or a hydrophilic material that is capable to degrade at a controlled and known rate based on the level of water measured in the soil.

9. The cartridge device of claim 1 further comprising an adjustment member positioned on the cartridge body that is configured to modify the desired depth within the soil that the seed is planted after being discharged by the distribution device and received by the soil.

10. The cartridge device of claim 1 further comprising a ground stop member positioned along the cartridge body to prevent the cartridge body from entering the soil further than the position of the ground stop member on the cartridge body.

11. The cartridge device of claim 1 further comprising a retainer member that protrudes from a side of the cartridge body for alignment with a cartridge assembly and within an inner passageway of a distribution device.

12. The cartridge device of claim 1 wherein the cartridge body is configured to be discharged from the barrel of a distribution device mounted to an aerial vehicle.

13. The cartridge device of claim 1 further comprising a skirt that extends from the cartridge device and is configured to assist with projectile trajectory.

14. The cartridge device of claim 1, wherein the cartridge body includes a range of lengths depending on application in which the device is about ⅛" to about 6" long.

15. The cartridge device of claim 14 wherein the cartridge body includes a range of lengths that is about 1" to about 4" long.

16. The cartridge device of claim 15, wherein the cartridge body includes a range of length that is about 1" to about 3" long.

17. The cartridge device of claim 1, wherein he cartridge device includes a range of perimeter widths in which the device is about ⅛" to about 3" wide.

18. The cartridge device of claim 17, wherein the cartridge device includes a range of perimeter widths in which the device is about ½" to about 2" wide.

19. The cartridge device of claim 1, wherein the cartridge body is made from a material that is configured to maintain its structural integrity as it is stored in a cartridge assembly and when ejected through a barrel of a distribution device, while also configured to degrade once ejected into the soil.

20. The cartridge device of claim 19, wherein said material is configured to be sprayed with an activator solution to activate a degradation process of the material and to assist to degrade the material when positioned in the soil wherein the rate of degradation is based on a level of water or moisture in the soil.

* * * * *